United States Patent
Fagan

(10) Patent No.: US 11,305,658 B2
(45) Date of Patent: Apr. 19, 2022

(54) CHARGER FOR CHARGING AN ELECTRIC VEHICLE

(71) Applicant: ENGINEER & ARTIST PTY LTD, Victoria (AU)

(72) Inventor: Anthony Fagan, Victoria (AU)

(73) Assignee: ENGINEER & ARTIST PTY LTD, Victoria (AU)

(*) Notice: Subject to any disclaimer, the term of this patent is extended or adjusted under 35 U.S.C. 154(b) by 138 days.

(21) Appl. No.: 16/617,897

(22) PCT Filed: Jun. 1, 2018

(86) PCT No.: PCT/AU2018/050542
§ 371 (c)(1),
(2) Date: Nov. 27, 2019

(87) PCT Pub. No.: WO2018/218306
PCT Pub. Date: Dec. 6, 2018

(65) Prior Publication Data
US 2020/0189413 A1 Jun. 18, 2020

(30) Foreign Application Priority Data
Jun. 2, 2017 (AU) ............... 2017902098

(51) Int. Cl.
*H02J 7/00* (2006.01)
*B60L 53/18* (2019.01)
(Continued)

(52) U.S. Cl.
CPC .............. *B60L 53/18* (2019.02); *B60L 50/60* (2019.02); *B60L 53/16* (2019.02); *B60L 53/36* (2019.02);
(Continued)

(58) Field of Classification Search
CPC ....... B60L 53/18; H01R 13/631; H02J 7/0045
(Continued)

(56) References Cited

U.S. PATENT DOCUMENTS 7,999,506 B1 8/2011 Hollar
8,025,526 B1* 9/2011 Tormey .................. B60L 53/18
439/528

(Continued)

FOREIGN PATENT DOCUMENTS

CN 205736996 11/2016
CN 106314181 1/2017
(Continued)

OTHER PUBLICATIONS

International Search Report and Written Opinion of the International Searching Authority for PCT/AU2018/050542, dated Aug. 15, 2018, 16 pages.
(Continued)

*Primary Examiner* — Suchin Parihar
(74) *Attorney, Agent, or Firm* — Heslin Rothenberg Farley & Mesiti P.C.; Jacquelyn A. Graff, Esq.

(57) ABSTRACT

A charger for charging an electric vehicle, comprising: a movable plug assembly comprising a downward facing plug that is connectable to an upward facing socket on top of the electric vehicle, the moveable plug assembly being mounted above the electric vehicle such that the movable plug assembly can be moved to be above the electric vehicle when the downward facing plug is not connected to the upward facing socket; a downward facing image capturing device; and a controller connected to the movable plug assembly and the downward facing image capturing device, and arranged to: control the downward facing image capturing device to capture at least one image in respect of the upward facing socket; and when the downward facing plug
(Continued)

is not in alignment or connection with the upward facing socket, control a movement in respect of the movable plug assembly based on the at least one image, in order to enable the downward facing plug to move from above the electric vehicle downwards into alignment or connection with the upward facing socket.

20 Claims, 11 Drawing Sheets

(51) Int. Cl.
   *B60L 50/60* (2019.01)
   *B60L 53/36* (2019.01)
   *B60L 53/16* (2019.01)
   *B60L 53/37* (2019.01)
   *H01R 13/631* (2006.01)

(52) U.S. Cl.
   CPC .......... *B60L 53/37* (2019.02); *H01R 13/631* (2013.01); *H02J 7/0045* (2013.01); *H01R 2201/26* (2013.01)

(58) Field of Classification Search
   USPC ........................................ 320/109
   See application file for complete search history.

(56) References Cited

U.S. PATENT DOCUMENTS

| | | | | |
|---|---|---|---|---|
| 9,853,396 | B1* | 12/2017 | Musick | H01R 13/562 |
| 10,807,479 | B2* | 10/2020 | Ryu | B60L 50/50 |
| 2006/0178028 | A1* | 8/2006 | Swiatek | H01R 24/58 |
| | | | | 439/215 |
| 2012/0233062 | A1 | 9/2012 | Cornish | |
| 2013/0076902 | A1 | 3/2013 | Gao | |
| 2014/0176070 | A1* | 6/2014 | Krammer | B60L 53/16 |
| | | | | 320/109 |
| 2014/0354229 | A1 | 12/2014 | Zhao | |
| 2015/0210174 | A1* | 7/2015 | Settele | B60L 53/37 |
| | | | | 320/109 |
| 2016/0339791 | A1 | 11/2016 | Sim | |
| 2017/0008412 | A1 | 1/2017 | Wu | |
| 2017/0253137 | A1* | 9/2017 | Stauber | B60L 53/18 |
| 2018/0251102 | A1* | 9/2018 | Han | B60L 50/66 |
| 2019/0135133 | A1* | 5/2019 | Miller | B60L 53/14 |
| 2019/0232809 | A1* | 8/2019 | Baylard | B60L 53/60 |
| 2019/0340782 | A1* | 11/2019 | Sinha | G06K 9/6202 |
| 2020/0094700 | A1* | 3/2020 | Hui | B60L 53/60 |

FOREIGN PATENT DOCUMENTS

| | | |
|---|---|---|
| EP | 3064393 | 9/2016 |
| WO | 2014015991 | 1/2014 |
| WO | 2015018887 | 2/2015 |
| WO | 2015112355 | 7/2015 |

OTHER PUBLICATIONS

Extended European Search Report for European Patent Application No. 18810548.0, dated Feb. 8, 2021, 9 pages.

* cited by examiner

CHARGER FOR CHARGING AN ELECTRIC VEHICLE

CROSS REFERENCE TO RELATED APPLICATIONS

This application is a national stage filing under section 371 of International Application No. PCT/AU2018/0050542, filed on Jun. 1, 2018, and published on Dec. 6, 2018 as WO 2018/218306, which claims priority to Australian Application No. 2017902098, filed Jun. 2, 2017. The entire contents of each application are incorporated herein by reference in their entireties.

FIELD

The present invention relates to a charger for charging an electric vehicle, and is of particular but by no means exclusive application in charging electric vehicles having a roof mounted socket.

BACKGROUND

While electric vehicles are increasingly common, there is currently a lack of publicly available infrastructure for charging electric vehicles. Accordingly, most electric vehicles are currently charged at private locations such as the homes of the drivers of the electric vehicles. In this respect, the chargers used at the homes of the drivers resemble the petrol pumps provided at petrol stations to re-fuel conventional petrol powered vehicles in that the chargers require the drivers to manually operate the chargers to charge their electric vehicles.

There is a need to provide an alternative or improved charger to those currently used for charging electric vehicles.

SUMMARY OF INVENTION

In a first aspect, the invention provides a charger for charging an electric vehicle, comprising:
a movable plug assembly comprising a downward facing plug that is connectable to an upward facing socket on top of the electric vehicle, the moveable plug assembly being mounted above the electric vehicle such that the movable plug assembly can be moved to be above the electric vehicle when the downward facing plug is not connected to the upward facing socket;
a downward facing image capturing device; and
a controller connected to the movable plug assembly and the downward facing image capturing device, and arranged to:
control the downward facing image capturing device to capture at least one image in respect of the upward facing socket; and
when the downward facing plug is not in alignment or connection with the upward facing socket, control a movement in respect of the movable plug assembly based on the at least one image, in order to enable the downward facing plug to move from above the electric vehicle downwards into alignment or connection with the upward facing socket.

In an embodiment, the controller controls the downward facing image capturing device to capture the at least one image in respect of the upward facing socket, by:
controlling the downward facing image capturing device to repeatedly capture one or more images until the controller recognizes the upward facing socket from the one or more images.

In an embodiment, the controller recognizes the upward facing socket from the one or more images, by recognizing at least one visual indicator on the electric vehicle from the one or more images.

In a second aspect, the invention provides a charger for charging an electric vehicle, comprising:
a movable plug assembly comprising a downward facing plug that is connectable to an upward facing socket on top of the electric vehicle, the moveable plug assembly being mounted above the electric vehicle such that the movable plug assembly can be moved to be above the electric vehicle when the downward facing plug is not connected to the upward facing socket;
a proximity sensor; and
a controller connected to the movable plug assembly and the proximity sensor, and arranged to:
control the proximity sensor to sense whether or not the downward facing plug is within a predetermined proximity of the upward facing socket; and
upon the proximity sensor sensing that the downward facing plug is not within the predetermined proximity of the upward facing socket, control a movement in respect of the movable plug assembly in order to enable the downward facing plug to move from above the electric vehicle downwards into alignment or connection with the upward facing socket.

In an embodiment, the controller is arranged to control the downward facing plug to output electric charge to charge the electric vehicle upon the proximity sensor sensing that the downward facing plug is within the predetermined proximity of the upward facing socket.

In an embodiment, the movable plug assembly comprises:
a mount for enabling the movable plug assembly to be mounted above the electric vehicle; and
an extendable arm comprising:
a first end connected to the mount; and
an opposite second end at which the downward facing plug is provided.

In an embodiment, the movable plug assembly is mounted to a ceiling of a garage for storing the electric vehicle.

In an embodiment, the extendable arm comprises a first section connected to the mount by a first pivot.

In an embodiment, the charger further comprises a first actuator connected to the mount and the first section, and arranged to extend the first section away from the mount on the first pivot or contract the first section towards the mount on the first pivot.

In an embodiment, the controller is arranged to control the first actuator to move the downward facing plug vertically and/or longitudinally towards the upward facing socket.

In an embodiment, the extendable arm comprises a second section connected to the first section by a second pivot.

In an embodiment, the charger further comprises a second actuator connected to the first section and the second section, and arranged to extend the downward facing plug away from the first section on the second pivot or contract the downward facing plug towards the first section on the second pivot.

In an embodiment, the controller is arranged to control the second actuator to move the downward facing plug vertically and/or longitudinally towards the upward facing socket.

In an embodiment, the mount is a laterally movable platform, and the controller is arranged to control the laterally movable platform to move the downward facing plug laterally towards the upward facing socket.

In an embodiment, the downward facing plug is provided in a self-aligning head that pivots, translates and/or rotates the downward facing plug when the downward facing plug is moving downwards into alignment or connection with the upward facing socket.

In an embodiment, the self-aligning head is arranged to spring back to a downward facing position when the downward facing plug is moved upwards out of alignment or connection with the upward facing socket.

In an embodiment, the self-aligning head comprises at least one tapered guide corresponding to at least one chamfered guide slot of the upward facing socket, wherein the at least one tapered guide rotates the downward facing plug into alignment or connection with the upward facing socket when the at least one tapered guide is moving downwards into alignment or connection with the at least one chamfered guide slot.

In an embodiment, the self-aligning head comprises a chamfered cylindrical surface having a smaller diameter than a corresponding cylindrical surface of the upward facing socket,
wherein the at least one chamfered cylindrical surface translates the downward facing plug into alignment or connection with the upward facing socket when the at least one chamfered cylindrical surface is moving downwards into alignment or connection with the corresponding cylindrical surface of the upward facing socket.

In an embodiment, the self-aligning head is connected to an end of the movable plug assembly by a pivot, and is arranged to pivot the downward facing plug into alignment or connection with the upward facing socket when the downward facing plug is moving downwards into alignment or connection with the upward facing socket.

In a third aspect, the invention provides a charger for charging an electric vehicle, comprising:
a movable plug assembly comprising:
    a downward facing plug that is connectable to an upward facing socket on top of the electric vehicle, the moveable plug assembly being mounted above the electric vehicle such that the movable plug assembly can be moved to be above the electric vehicle when the downward facing plug is not connected to the upward facing socket;
an image capturing device;
a proximity sensor; and
a controller connected to the movable plug assembly, the image capturing device and the proximity sensor, and arranged to:
    control the image capturing device to capture at least one image in respect of the upward facing socket; and
    when the downward facing plug is not in alignment or connection with the upward facing socket, control a first movement in respect of the movable plug assembly based on the at least one image, in order to enable the downward facing plug to move from above the electric vehicle downwards into alignment with the upward facing socket;
    control the proximity sensor to sense whether or not the downward facing plug is within a predetermined proximity of the upward facing socket; and
    upon the proximity sensor sensing that the downward facing plug is not within the predetermined proximity of the upward facing socket, control a second movement in respect of the movable plug assembly in order to enable the downward facing plug to move from above the electric vehicle downwards into alignment or connection with the upward facing socket.

BRIEF DESCRIPTION OF DRAWINGS

In order that the invention may be more clearly ascertained, embodiments will now be described, by way of example, with reference to the accompanying drawings, in which.

DETAILED DESCRIPTION OF EMBODIMENTS

Figure 1:
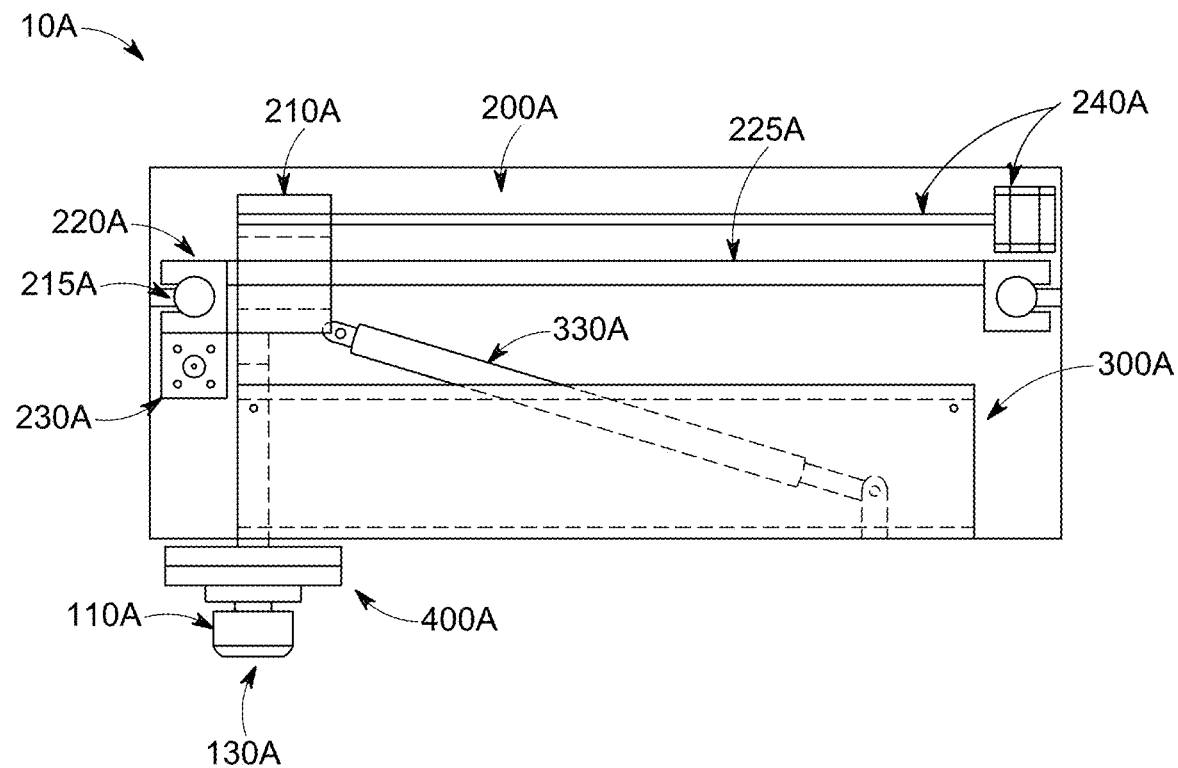
FIG. 1 is a side view of an embodiment of the charger when the vertically extendable arm is retracted.
Figure 1:
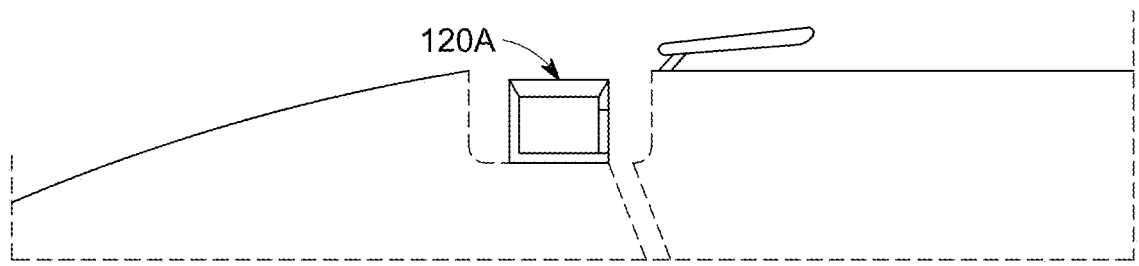

Referring to the drawings, there is shown a charger 10A, 10B for charging an electric vehicle. The charger 10A, 10B comprises a movable plug assembly and a controller 500 connected to the movable plug assembly. The movable plug assembly includes a downward facing plug 110A, 110B that can be connected to an upward facing socket 120A, 120B on top of the electric vehicle. The controller 500 is arranged to control a movement in respect of the movable plug assembly.

Depending on the embodiment, the charger 10A, 10B may include one or more downward facing image capturing devices 130A, 130B, one or more proximity sensors 140A, 140B or both one or more downward facing image capturing devices 130A, 130B and one or more proximity sensors 140A, 140B.

In an embodiment where the charger 10A, 10B includes the downward facing image capturing device 130A, 130B, the controller 500 controls the movement in respect of the movable plug assembly based on at least one image in respect of the upward facing socket 120A, 10B captured by the downward facing image capturing device 130A, 130B, in order to enable the downward facing plug 110A, 110B to move into alignment or connection with the upward facing socket 120A, 120B.

In another embodiment where the charger 10A, 10B includes a proximity sensor 140A, 140B, the controller 500 alternatively (or additionally, if the charger 10A, 10B also includes the downward facing image capturing device 130A, 130B) controls the movement in respect of the movable plug assembly upon the proximity sensor 140A, 140B sensing that the downward facing plug 110A, 110B is not within a predetermined proximity of the upward facing socket 120A, 120B, in order to enable the downward facing plug 110A, 110B to move into alignment or connection with the upward facing socket 120A, 120B.

The charger 10A, 10B is advantageous in that it comprises a downward facing plug 110A, 110B suitable for charging an electric vehicle with an upward facing socket 120A, 120B on top of the electric vehicle and enables an automatic spatial alignment (in particular, vertical, lateral and/or longitudinal alignment) of the downward facing plug 110A, 110B to move into alignment or connection with the upward facing socket 120A, 120B on top of the electric vehicle, without requiring a person (such as the driver of the electric vehicle) to manually align the downward facing plug 110A, 110B with the upward facing socket 120A, 120B. This automatic alignment in turns enables an automatic connection of the downward facing plug 110A, 110B to the upward facing socket 120A, 120B (that is, an automatic "plug in" of the electric vehicle into the charger 10A, 10B such that conductors 113A, 113B of the downward facing plug 110A, 110B make contact with conductors 123A, 123B of the upward facing socket 120A, 120B), and accordingly an automatic charging of the electric vehicle by the charger 10A, 10B without requiring a person to manually operate the charger 10A, 10B. Thus, a person skilled in the art will appreciate that the charger 10A, 10B is advantageous in that it may be an automated or automatic charger 10A, 10B.

Figure 2A:
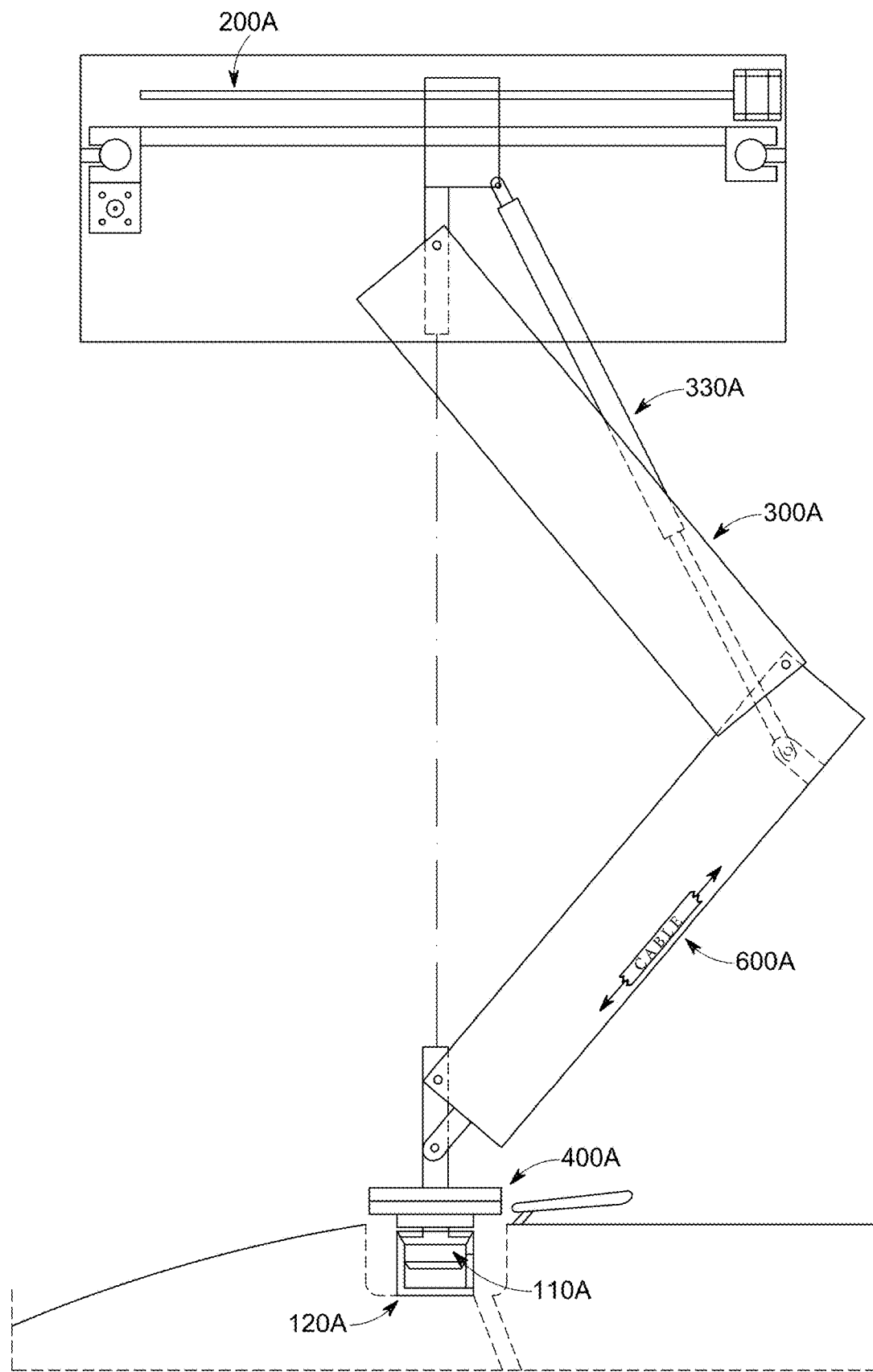
FIG. 2A is a side view of the charger of FIG. 1 when the vertically extendable arm is extended.

FIGS. 1 and 2A are side views of an embodiment of the charger 10A. In this embodiment, the charger 10A is mounted or suspended by way of a ceiling mount of a laterally movable platform 200A from a ceiling of a garage or car port for storing the electric vehicle, and the electric vehicle comprises an upward facing socket 120A mounted on the roof of the electric vehicle. As will be described in further detail below, the charger 10A is adapted to locate or recognize the upward facing socket 120A (which is underneath the charger 10A when the vehicle is parked in the garage), connect the downward facing plug 110A to the upward facing socket 120A after the upward facing socket 120A is located or recognized, and to charge the electric vehicle after the downward facing plug 110A is connected to the upward facing socket 120A.

As illustrated in FIGS. 1 and 2A, the charger 10A comprises a movable plug assembly. The movable plug assembly in turn includes a laterally movable platform 200A and a vertically extendable arm 300A. Thus, when the electric vehicle is parked in the garage before the downward facing plug 110A is moved into connection with the upward facing socket 120A, the vehicle is within a predetermined zone under the movable plug assembly.

The laterally movable platform 200A is adapted to move the downward facing plug 110A laterally in the X and Y directions (that is, X and Y axis in the horizontal plane as the charger 10A is mounted to the ceiling). In this embodiment, the laterally movable platform 200A is an overhead mounted unit composed of two gantry style linear slides or carriages 210A, 220A. These slides 210A, 220A comprise a number of components including a linear guide 215A for guiding lateral movement in the X axis and a guide shaft 225A for guiding lateral movement in the Y axis. A number of actuators are provided on the charger 10A for driving the slides 210A, 220A. These include two direct drive stepper motors and a ball screw 230A, 240A.

The vertically extendable arm 300A is adapted to move vertically downwards in the Z direction. In this embodiment, the vertically extendable arm 300A is a lightweight compact two-piece long travel folding arm 300A. The arm 300A is aluminium pressed and comprises a hollow pathway arranged to allow one or more electrical power or communication cables 600A to route through the arm 300A to the downward facing plug 110A. When not in use, the vertically extendable arm 300A can be retracted into a compact form. When in use, the vertically extendable arm 300A can be extended in a downward direction away from the ceiling from the compacted form to an extended form in order to enable the plug 110A to connect to the upward facing socket 120A provided on the roof of the electric vehicle. FIG. 1 shows the vertically extendable arm 300A when retracted. FIG. 2A shows the vertically extendable arm 300A when fully extended.

Persons skilled in the art will appreciate that the embodiment of FIG. 1 is particularly advantageous. For example, the vertically extendable arm 300A is advantageously driven or powered by only a single actuator 330A (in the form of a stepper motor) in this embodiment. It will however be appreciated that such advantages may not be present in all embodiments of the charger 10A. For instance, an alternative embodiment of the vertically extendable arm 300A may be powered by more than one actuator 330A and accordingly a person skilled in the art will appreciate that such an alternative embodiment is not advantageously driven or powered by only a single actuator.

Figure 2B:
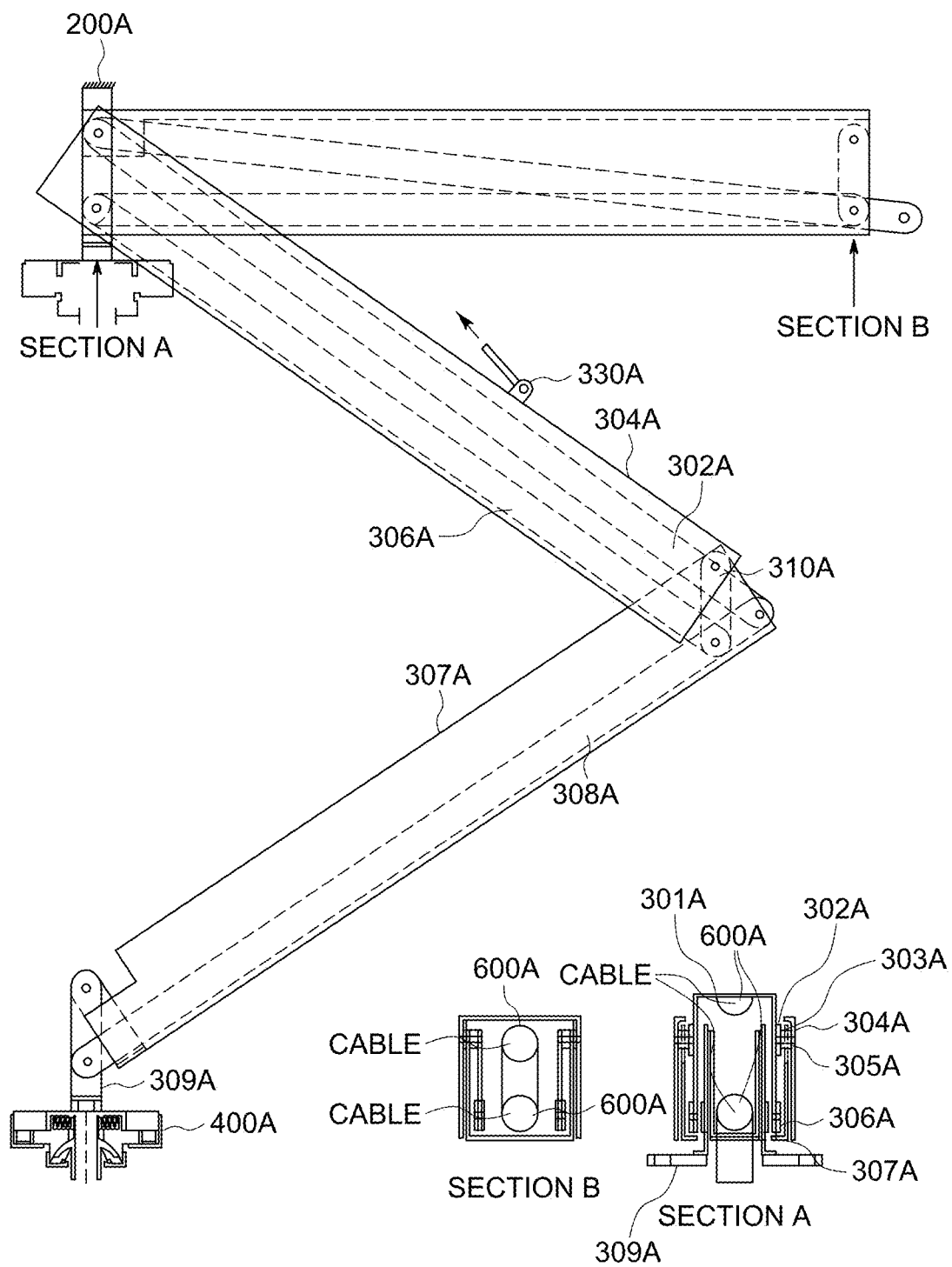
FIG. 2B is another side view of the charger of FIG. 1 when the vertically extendable arm is extended from a retracted position.

As will be described in greater detail below, the aluminium folding arm 300A comprises a plurality of parallel motion and connecting links 302A, 306A, 308A, 310A for enabling the above mentioned downward vertical movement. At one end of the aluminium folding arm 300A, the charger 10A also comprises an aligning head 400A to which a plug or plug head assembly 110A is fitted. The aligning head 400A is attached to an end of the vertically extendable arm 300A by way of an aligning head holder 309A (as illustrated in FIG. 2B).

As will be described in further detail below, the aligning head 400A comprises a number of passive alignment mechanisms that allow for small positional movements of the downward facing plug 100A. This allows correction of small positional, angular or rotational misalignment of the downward facing plug 100A relative to the upward facing socket 120A when the downward facing plug 100A is being moved into connection with the upward facing socket 120A. As the alignment mechanisms operate passively, any correction is made automatically by the aligning head 400A, without requiring manual (that is, user) input or intervention.

As indicated above, the charger 10A may include one or more downward facing image capturing devices 130A, one or more proximity sensors 140A or both one or more downward facing image capturing devices 130A and one or more proximity sensors 140A. In this embodiment, the downward facing plug 110 comprises a single image capturing device 130A and a single proximity sensor 140A. The image capturing device 130A is a camera centrally located within the downward facing plug 110A. However, it is envisaged that the image capturing device 130A may be some other type of image capturing device including one or multiple cameras. As will be described in greater detail below, images captured by the image capturing device 130A enable the charger 10A to locate the upward facing socket 120A mounted on the electric vehicle and determine the spatial movement required to move the downward facing plug 110A into vertical, lateral, or both vertical and lateral alignment with the upward facing socket 120A. Thus, depending on the embodiment, the spatial movement may include a vertical movement, a lateral movement, or both a lateral movement and a vertical movement. In this embodiment, the spatial movement is continually refined by the charger 10A, and is determined based on specific parameters (such as the apparent size and position of a light emitting diode (LED)) identified from the image or images captured by the image capturing device 130A (more specifically, by comparing the specific parameters to reference parameters stored by the charger 10A). Once the downward facing plug 110A is moved into alignment with the upward facing socket 120A based on the image or images captured by the downward facing camera 130A, the proximity sensor 140A is then used to refine and stop the final spatial movement required to move the downward facing plug 100A into connection with the upward facing socket 120A. In this respect, it will be appreciated that the charger 10A is advantageous when compared to existing chargers because the downward facing camera 130A is centrally located in the downward facing plug 110A which (i) avoids the problem of "masking" (that is, where a camera's view of the socket might be blocked by a portion of the plug) when capturing an image or images of the upward facing socket 120A, and (ii) makes for easier spatial referencing of the upward facing socket 120A.

Figure 11:
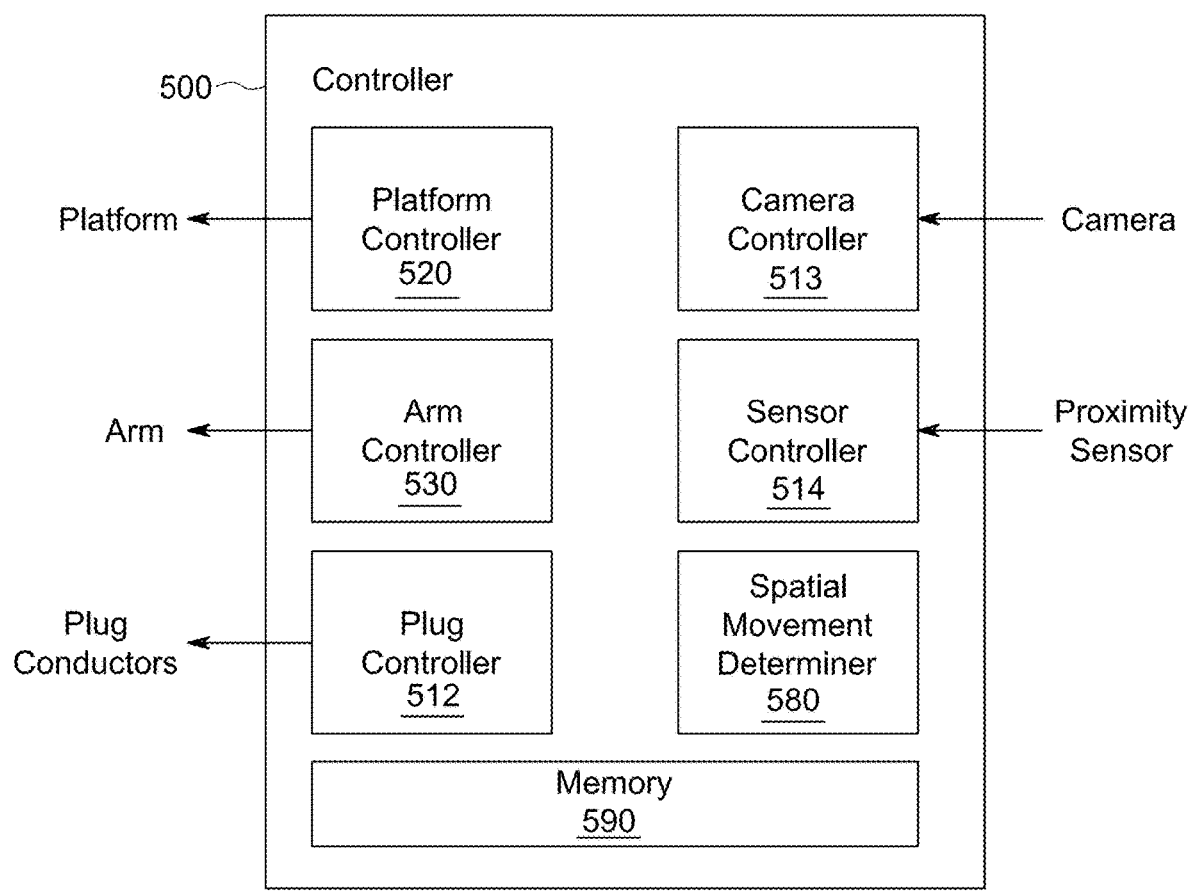
FIG. 11 is a functional block diagram of the modules implemented by the controller of either the charger of FIG. 1 or the charger of FIG. 6.

The charger 10A also comprises a controller or control system 500 (as shown in FIG. 11) in the form of an electronic control unit. This unit 500 is arranged to control the active components of the charger 10A, for example, the above mentioned actuators 230A, 240A, 330A of the movable plug assembly to control the movement in respect of the movable plug assembly. In particular, the controller 500 controls the actuators 230A, 240A of the laterally movable platform 200A to control the lateral movement of the laterally movable platform 200A, and controls the single actuator 330A of the vertically extendable arm 300A to control the vertical movement of the vertically extendable arm 300A.

In this embodiment, the controller 500 is also adapted to control the other active components of the charger 10A such as the image capturing device 130A and the proximity sensor 140A. In this embodiment, the unit 500 also communicates with the electric vehicle wirelessly. The controller 500 is described in further detail below. Thus, the controller 500 acts as a central controller in this embodiment. It will be appreciated in this respect that, in an alternative embodiment, the charger 10A may include more than one controller and that control of various components may be performed individually at each component in a distributed manner.

Referring now to diagram 2B, the vertically extendable arm 300A is attached at one end to the laterally movable platform 200A. As indicated above, the vertically extendable arm 300A operates in the Z axis. Thus, when the charger 10A is mounted to the ceiling, the vertically extendable arm 300A is attached to the laterally movable platform 200A at an upper end of the arm 300A.

The vertically extendable arm 300A comprises an upper arm 304A and a lower arm 307A. The lower arm 307A is smaller than the upper arm 304A, and can be nestled inside the larger arm 304A when the vertically extendable arm 300A is retracted or raised to the ceiling. The two arms 304A, 307A form two channels which together provide a continuous pathway through which one or more electrical cables 600A can pass (without overly bending each cable 600A).

A cross section of the left end of the vertically extendable arm 300A is shown in section A of FIG. 2B. As illustrated, the left end of the vertically extendable arm 300A is attached to the laterally movable platform 200A by a mount 301A that supports the upper arm 304A. As shown in FIG. 2B, the upper arm 304A is adapted to pivot about an axis on a first position in respect of the mount 301A and the lower arm 307A is adapted to pivot about an axis on a second position in respect of the upper arm 304A at the right end of the upper arm 304A.

As indicated above, the vertically extendable arm 300A comprises a plurality of links 302A, 306A, 308A, 310A. The upper section or arm 304A is mechanically joined or connected to the lower section or arm 307 by this system of linkages 302A, 306A, 308A, 310A. Additionally, the upper arm 304A and the lower arm 307, together with the pairs of linkages 306A, 308A and 310A are arranged in the form of a double parallelogram.

The system of linkages 302A, 306A, 308A, 310A includes a pair of connecting links 302A within the upper arm 304A. This pair of connecting links 302A joins to the extended part of the pair of lower links 308A and it is the geometric relationship between these pairs of links that contributes to the motion of the vertically extendable arm 300A. This pair of connecting links 302A pivots on the same axis as the upper arm 304A. The system of linkages 302A, 306A, 308A, 310A also includes a pair of upper links 306A that pivots on the same axis as the upper arm 304A, but on a position lower than the first position. These two pairs of links 302A, 306A form the system of linkages in the upper arm 304A.

The system of linkages 302A, 306A, 308A, 310A also includes two pairs of links 308A, 310A within the lower arm 307A. At the right end of the lower arm 307A is a pair of middle links 310A that is shorter than both the pair of connecting links 302 and the pair of upper links 306A. There is also a pair of lower links 308A connected to the pair of middle links 310A. The pair of middle links 310A pivots on the same axis as the lower arm 307A at their upper connection. The lower connecting point of the pair of middle links 310A connects to the pair of lower links 308A.

In addition to system of linkages 302A, 306A, 308A, 310A, the vertically extendable arm 300A also includes an aligning head holder 309A attached to the vertically extendable arm 300A at one end of the lower arm 307A. The pivot point of the aligning head holder 309A is inside the outer shape of the lower arm 307A on a separate bracket. A cross section of an end of the vertically extendable arm 300A is shown in section A of FIG. 2B. As illustrated in the section, by having a pivot point inside the outer shape of the lower arm 307A on a separate bracket, the lower arm 307A can retract into the upper arm 304A and electrical cable or cables 600A can pass through from the upper arm 304 via the lower arm 307A to the downward facing plug 110A within the aligning head holder 309A.

The pair of lower links 308A connects to a pivot on the aligning head holder 309A in order to allow the aligning head holder 309A to stay vertical when the vertically extendable arm 300A extends or retracts.

As indicated above, the charger 10A includes an aligning head 400A connected to the vertically extendable arm 300A by way of the above mentioned aligning head holder 309A. The downward facing plug 110A is adapted to be fitted on to the aligning head 400A.

As will be described in further below in respect of FIGS. 3A and 3B, the aligning head 400A includes a number of mechanisms for enabling passive alignment or movement of the downward facing plug 110A when the downward facing plug 110A is connecting to or entering into the upward facing socket 120A, and a number of mechanisms for enabling the downward facing plug 110A to return to a default position when the downward facing plug 110A disengages with the upward facing socket 120A.

Figure 3A:
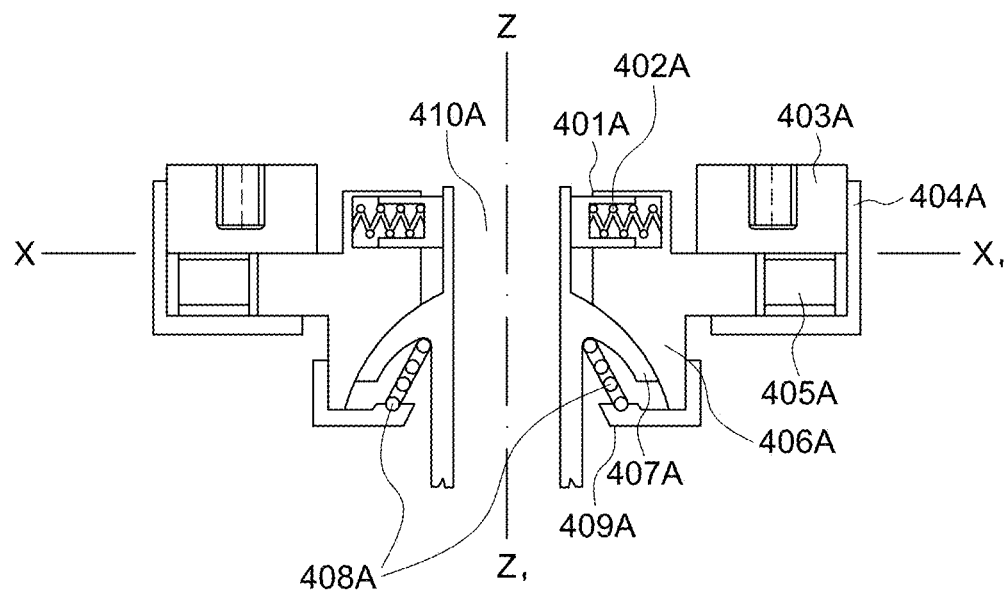
FIG. 3A is a sectional view of the self-aligning head of the charger of FIG. 1.

FIG. 3A is a sectional view of the aligning head 400A. As illustrated in the figure, the aligning head 400A features a low profile design, and comprises a mount 403A to which an upper cap 404A is attached. In between the mount 403A and the upper cap 404A is a movable alignment slide 406A. The outer diameter of the slide 406A is separated from the inner diameter of the upper cap 404A by a leaf ring spring 405A which allows the slide 406A to move in the X and Y planes when the downward facing plug 110A is engaging with the upward facing socket 120A and to return to a default center position when the downward facing plug 110A is disengaged from the upward facing socket 120A. On the inner and outer diameters of the leaf ring spring 405A are a number of protruding keys adapted to engage with a number of slots in the slide 406A and the upper cap 404A to counteract any rotation of the slide 406A.

The aligning head also comprises a pivotable connecting head 407A that the downward facing plug 100A is fitted to. As illustrated in FIG. 3A, the connecting head 407A comprises a hollow centre 410A for allowing one or more electrical cables 600 to pass through the aligning head 400A to the downward facing plug 110A (for example, to the image capturing device 130A, the proximity sensor 140A, and to the conductors 113A for charging the electric vehicle).

The connecting head 407A can pivot at an angle to the Z axis, by movement between the mating spherical surfaces of the connecting head 407A and the slide 406A. A tapered coil lift spring 408A provides an upwards force to keep the spherical surfaces of the connecting head 407A and the slide 406A in contact. The tapered coil lift spring 408A is supported by a lower cap 409A. A square cam profile is incorporated in the upper section of the connecting head 407A to control any rotation of the connecting head 407A. Applying forces to the cam faces are four anti-rotation followers 402A each comprising one or more springs 401A. These followers 402A rotate the aligning head 400A back to a default position when the downward facing plug 110A is disengaged with the upward facing socket 120A.

Figure 3B:
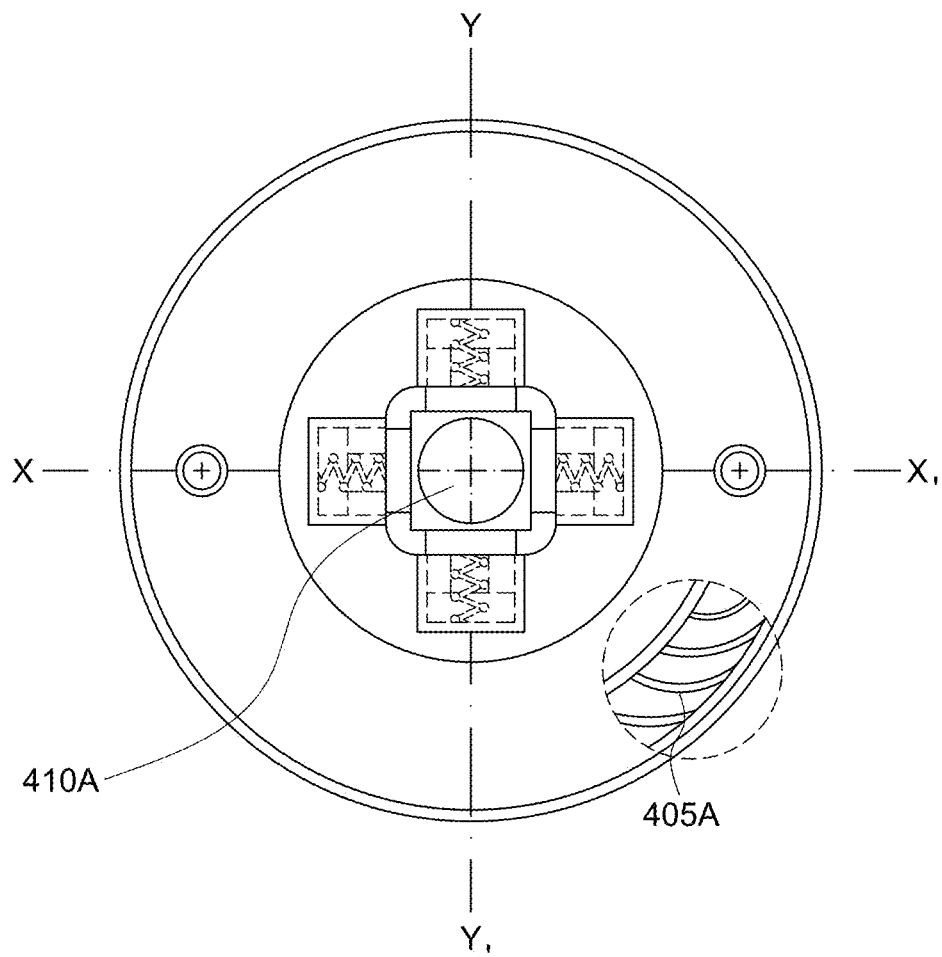
FIG. 3B is a top view of the self-aligning head of FIG. 3A.

FIG. 3B is a top view of the aligning head 400A showing the centre cable pathway 410A that allows room for movement of one or more electrical cable or cables 600A passing through the aligning head 400A to the downward facing plug 110A (that is, to the image capturing device 130A, the proximity sensor 140A, the conductors 113A for charging the electric vehicle etc.), and a more detailed X-ray view showing in greater detail the arrangement of the leaf ring spring 405A.

Figure 4A:
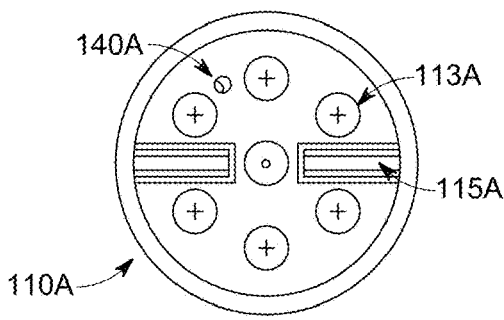
FIG. 4A is a bottom view of the downward facing plug of the charger of FIG. 1.
Figure 4B:
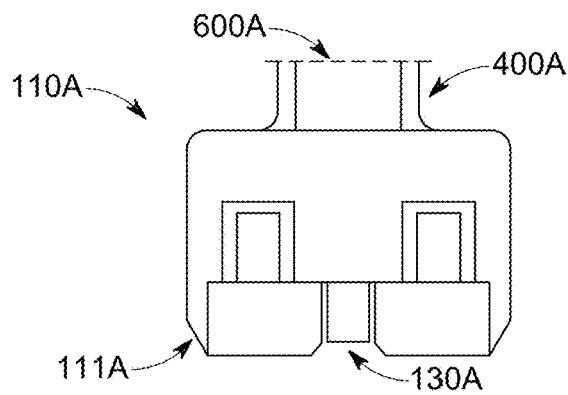
FIG. 4B is a sectional view of the downward facing plug of FIG. 4A.

FIG. 4A is a bottom view of the downward facing plug 110A and FIG. 4B is a sectional view of the downward facing plug 110A. As illustrated in these figures, the downward facing plug 110A includes a centrally located image capturing device 130A in the form of a camera and a single position sensor 140A in the form of a proximity sensor. In this embodiment, both the downward facing camera 130A and the proximity sensor 140A are provided at one side of the downward facing plug 110A. Thus, both the downward facing camera 130A and the sensor 140A are disposed at an end of the vertically extendable arm 300A.

In this embodiment, the downward facing camera 130A is disposed at the centre of the downward facing plug 110A and the sensor 140A is disposed at an off-centre location. It is envisaged however that either or both the downward facing camera 130A and sensor 140A may be positioned differently.

The downward facing plug 110A also comprises a number of conductors 113A arranged around the centrally located image capturing device 130A. In this embodiment, there are six female conductors 113A in the downward facing plug 110A. However, it is envisaged that, in an alternative embodiment of the charger 10A, there may be more or less than six conductors 113A in the downward facing plug 110A. As will be described in greater detail below in respect of the controller 500 illustrated in FIG. 11, these conductors 113A provide not only power from the charger 10A to the electric vehicle, but may also enable the charger 10A to communicate with (for example, to receive commands from or to send information to) the electric vehicle in this embodiment.

The downward facing plug 110A also comprises a lead in design 111A that allows for any slight lateral misalignment when the movable plug assembly moves the downward facing plug 110A into the upward facing socket 120A. In this embodiment, the lead in design is at an approximately 30 degrees angle, and can correct misalignment of about 6 mm (that is, +/−6 mm). However, it is envisaged that, in another embodiment, the lead in angle may be different or that there may be no lead in at all.

The downward facing plug 100A also includes a number of alignment guides 115A to correct for any slight rotational misalignment when the movable plug assembly moves the downward facing plug 110A into the upward facing socket 120A. In this embodiment, these guides 115A are in the form of two female alignment guides that can correct for misalignment of about 5 degrees. Like with the lead in design, it is envisaged that, in another embodiment, the number or form of the alignment guides may be different or that there may be no alignment guides at all.

Figure 5A:
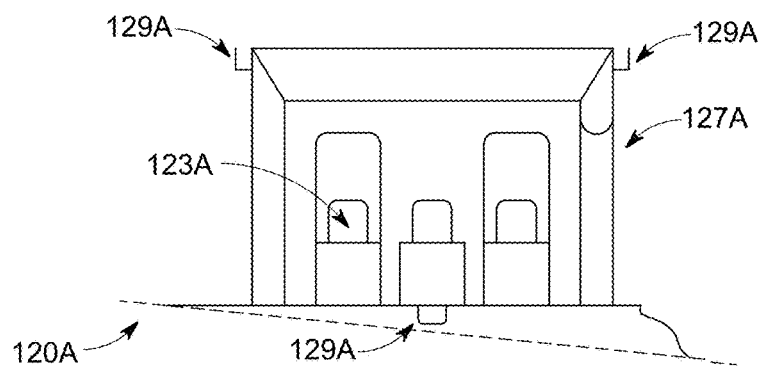
FIG. 5A is a sectional view of the upward facing socket on top of an electric vehicle.
Figure 5B:
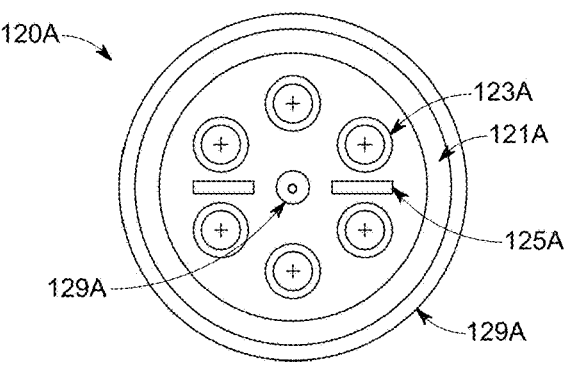
FIG. 5B is a bottom view of the upward facing socket on top of the electric vehicle of FIG. 5A.

Turning now to the upward facing socket 120A, FIG. 5A is a sectional view of the upward facing socket 120A and FIG. 5B is a bottom view of the upward facing socket 120A. As illustrated, the upward facing socket 120A includes a number of conductors 123A for receiving power or electrical power from the downward facing plug 110A. In this embodiment, these conductors 123A are in the form of six male conductors that correspond to the six female conductors 113A of the downward facing plug 110A. The conductors 123A of the upward facing socket 120A are raised up off the base of the upward facing socket 120A to allow for drainage and debris to fall through. Also, the upward facing socket 120A comprises two male rotational alignment guides 125A for aligning the downward facing plug 110A to the upward facing socket 120A before the conductors 113A, 123A of the downward facing plug 110A and the upward facing socket 120A make contact.

In this embodiment, the upward facing socket 120A is provided at an off-centre location on the roof of the electric vehicle near the rear pillar (that is, at the pillar nearest the back end of the electric vehicle) of the roof of the electric vehicle. This is advantageous in that roof racks can be used even when the charger 10A is charging the electric vehicle. It is envisaged that the upward facing socket 120A may alternatively not be positioned at an off-centre location on the roof of the electric vehicle near the rear pillar in an alternative embodiment. For example, in an alternative embodiment, the upward facing socket 120A may be positioned near a front pillar rather than the rear pillar of the roof of the electric vehicle.

As indicated above, images in respect of the upward facing socket 120A are captured by the downward facing camera 130A to enable the controller 500 to control the movement in respect of the movable plug assembly. As illustrated by FIGS. 5A and 5B, the upward facing socket 120A includes a number of indicators 129A for enabling the controller 500 to identify the upward facing socket 120A. Firstly, there is a LED light ring 129A disposed around a circumference of the upward facing socket 120A for illuminating the upward facing socket 120A. This light ring 129A points up and enables the controller 500 to identify the upward facing socket 120A when the downward facing camera 130A is relatively far away from the upward facing socket 120A. Secondly, there is a single LED positioned at the centre of the socket for enabling the controller 500 to identify the upward facing socket 120A when the downward facing camera 130A is closer to the socket. It is envisaged that the upward facing socket 120A may include alternative or additional indicators. For example, in an alternative embodiment, there may be only a single LED indicator disposed at a centre position of one side of the upward facing socket 120A.

While not shown in FIGS. 5A and 5B, the upward facing socket 120A is also fitted with a flush mounted cover flap driven by an actuator to open the cover flap when the upward facing socket 120A is in use (in particular, when the charger 10 is charging the electric vehicle) and to close the cover flap when the upward facing socket 120A is not in use. Thus, when the cover flap is closed, the upward facing socket 120A is moulded and sealed. As illustrated in FIG. 5A, in this embodiment, the upward facing socket 120A also has a drain assembly 127A formed from openings around the perimeter of the socket to allow water to escape or drain to a nearby window, down to the wheel arch etc.

Finally, like with the downward facing plug 110A, the upward facing socket 120A also comprises a lead in design 121A corresponding to that of the downward facing plug 110A. This lead in design allows for any slight lateral misalignment when the movable plug assembly moves the downward facing plug 110A into the upward facing socket 120A. In this embodiment, the lead in design of the socket-like with the downward facing plug 110A—is at an approximately 30 degrees angle. However, it is envisaged that, in another embodiment, the lead in angle may be different or that there may be no lead in at all Person skilled in the art will appreciate that the upward facing socket 120A may include other components. For example, it is envisaged that the electric vehicle may not have just one upward facing socket 120A. Thus, in an alternative embodiment, the electric vehicle may have an additional side entry socket for connection with other types of electric vehicle chargers.

Figure 6:
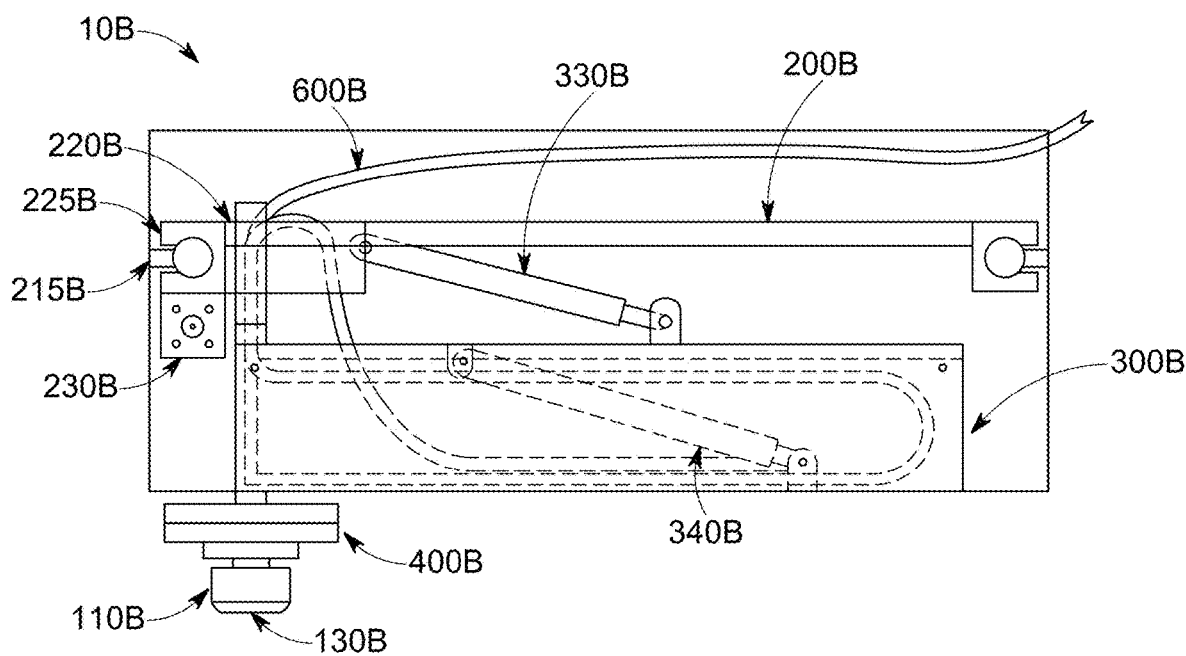
FIG. 6 is a side view of an alternative embodiment of the charger when the vertically and longitudinally extendable arm is retracted.
Figure 6:
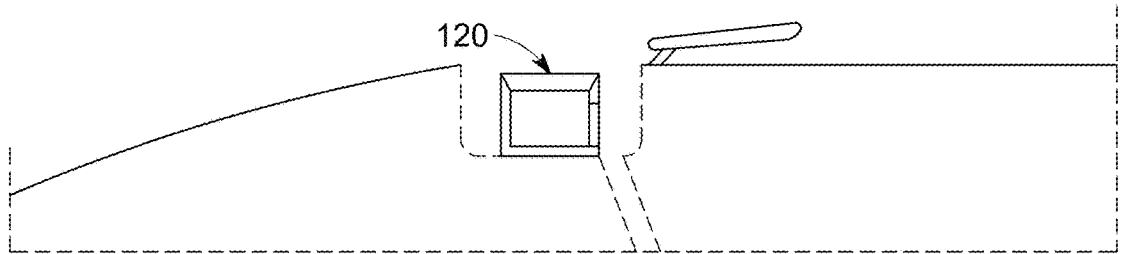
Figure 7A:
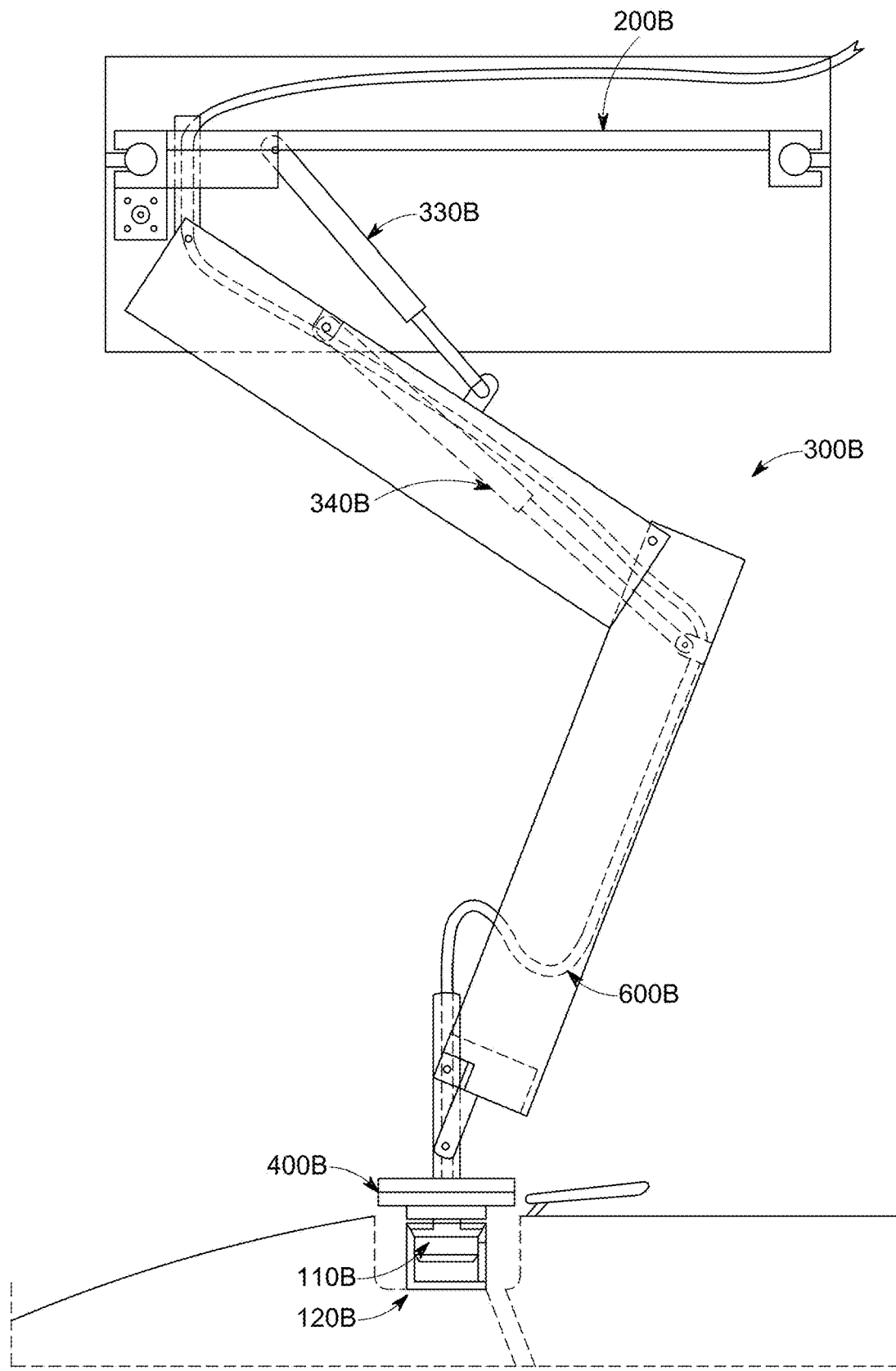
FIG. 7A is a side view of the charger of FIG. 6 when the vertically and longitudinally extendable arm is extended showing cable paths and actuators.

FIGS. 6 and 7A are side views of an alternative embodiment of the charger 10B. The charger 10B of this alternative embodiment-like the embodiment of FIGS. 1 to 5—is also mounted or suspended by way of a mount from a ceiling of a garage or car port for storing the electric vehicle. In this alternative embodiment, the electric vehicle comprises an upward facing socket 120B that is not only mounted but is also in a recess on top of the roof of the electric vehicle. Like the embodiment of FIGS. 1 to 5, the charger 10B of this alternative embodiment is adapted to locate the upward facing socket 120B (which is underneath the charger 10B when the vehicle is parked in the garage), connect the downward facing plug 110B to the upward facing socket 120B after the upward facing socket 120B is located, and to charge the electric vehicle after the downward facing plug 110B is connected to the upward facing socket 120B.

The charger 10B comprises a movable plug assembly including a laterally movable platform 200B that can slide or move laterally and a vertically and longitudinally extendable arm 300B that can extend vertically and longitudinally.

The laterally movable platform 200B is adapted to move the downward facing plug 110B laterally in the X and Y directions (that is, the X axis in the horizontal plane as the charger 10 is mounted to the ceiling. The X axis can also be described in this instance as being across the width of the vehicle. In this alternative embodiment, the platform 200B is an overhead mounted unit composed of a gantry style linear slide or carriage 220B. This slide 220 comprises a number of components including a pair of linear guide shafts 215B and a pair of linear bearings 225B for guiding lateral movement in the X axis. An actuator 230B is provided on the charger 10B for driving the slide 220B. This actuator 230B includes an electric drive motor, a position sensor and a lead screw. It is envisaged that the platform 200B may alternatively be adapted to move the downward facing plug 110B laterally in not just the X direction, but in both the X direction and the Y direction (that is, along the length of the vehicle and at right angles to the aforementioned X axis) in another embodiment.

The vertically and longitudinally extendable arm 300B is adapted to move vertically downwards in the Z direction as well as longitudinally in the Y axis direction. In this alternative embodiment, the vertically and longitudinally extendable arm 300B is a lightweight compact two-piece long travel folding arm 300B. The arm 300B is formed from aluminium extrusions and comprises a hollow pathway arranged to allow one or more electrical power or communication cables 600B to route through the arm 300B to the downward facing plug 110B. When not in use, the vertically and longitudinally extendable arm 300B can be retracted into a compact form. When in use, the vertically and longitudinally extendable arm 300B can be extended in a downward direction away from the ceiling from the compacted form to an extended form in order to enable the downward facing plug 110B to connect to the upward facing socket 120B provided in the recess on top the roof of the electric vehicle. FIG. 6 shows the vertically and longitudinally extendable arm 300B when retracted. FIG. 7A shows the vertically and longitudinally extendable arm 300B in a fully extended position. In this alternative embodiment, the vertically and longitudinally extendable arm 300B is driven by an upper actuator 330B and a lower actuator 340B. In this respect, it is envisaged that, in an alternative embodiment, the upper actuator 330B and lower actuator 340B may be built into the upper pivot points of each of the two main parts of the longitudinally and vertically extendable arm 300B.

Figure 7B:
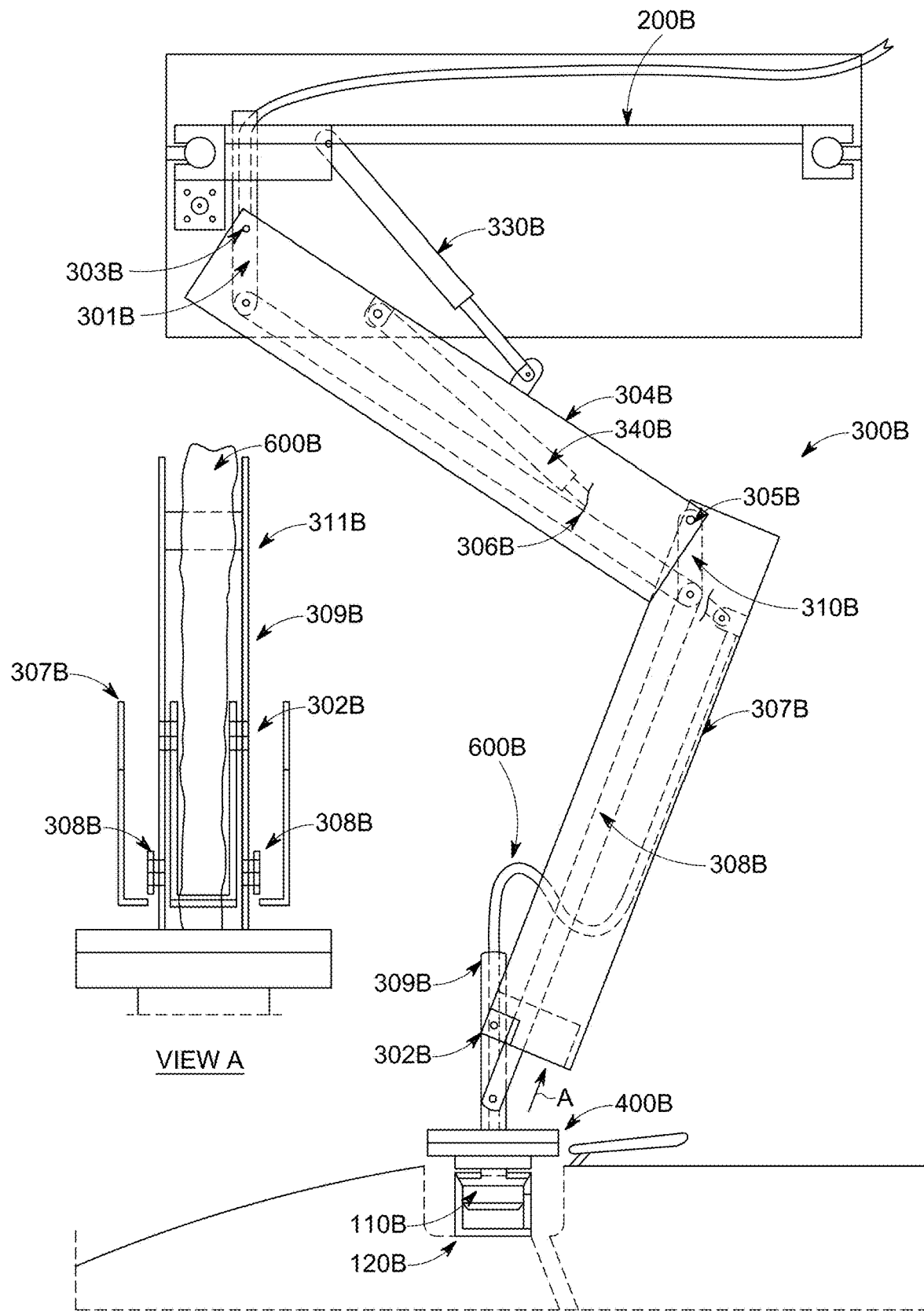
FIG. 7B is another side view of the charger of FIG. 6 when the vertically and longitudinally extendable arm is extended showing the mechanical linkages.

The aluminium folding arm 300B comprises a plurality of parallel motion links 306B, 308B, and 310B for enabling the centreline axis of the downward facing plug 110B to always remain vertical independent of the angular positions of each of the parts of the extendable arm 300B. At one end of the aluminium folding arm 300B, the charger 10B also comprises a self-aligning head 400B to which the downward facing plug or plug head assembly 110B is fitted. The self-aligning head 400B is attached to an end of the vertically and longitudinally extendable arm 300B by way of an aligning head holder 309 (as illustrated in FIG. 7B).

The self-aligning head 400B comprises a number of passive alignment mechanisms that allow for small positional movements of the downward facing plug 110B. This allows correction of small amounts of positional, angular or rotational misalignment of the downward facing plug 110B relative to the upward facing socket 120B when the downward facing plug 110B is being moved into connection with the upward facing socket 120B. As the alignment mechanisms operate passively, any correction to small amounts of positional, angular or rotational misalignment between the downward facing plug 100B and the upward facing socket 120B can made automatically by the self-aligning head 400B, without requiring manual (that is, user) input or intervention.

The charger 10B may include one or more downward facing image capturing devices 130B, one or more proximity sensors 140B or both one or more downward facing image capturing devices 130B and one or more proximity sensors 140B. In this alternative embodiment, the downward facing plug 110B comprises a single image capturing device 130B and a single proximity sensor 140B. The image capturing device 130B is a camera centrally located within the downward facing plug 110B. Thus, like with the embodiment of the charger 10A illustrated in FIGS. 1 to 5B, the charger 10B of this alternative embodiment is also advantageous when compared to existing chargers in that, by having a centrally located downward facing camera 130B, the charger 10B (i) avoids "masking" (or blocking of a portion) of the view from the downward facing camera 130B of the upward facing socket 120B when the downward facing camera 130B is capturing an image or images of the upward facing socket 120B, and (ii) makes for easier spatial referencing of the upward facing socket 120B. However, it is envisaged that the image capturing device 130B may be some other type of image capturing device including one or multiple cameras. As will be described in greater detail below, images captured by the image capturing device 130B enable the charger 10 to locate the upward facing socket 120B mounted on the electric vehicle and determine the spatial movement required to move the downward facing plug 110B into vertical, lateral, longitudinal, or all of vertical, lateral and longitudinal alignment with the upward facing socket 120B. Thus, depending on the embodiment, the spatial movement may include a vertical movement, a lateral movement, a longitudinal movement, or all of a lateral movement, a longitudinal movement and a vertical movement. In this alternative embodiment, the spatial movement is continually refined by the charger 10B, and is determined based on specific parameters (such as the apparent size and position of an LED or a contrasting edge) identified from the image or images captured by the image capturing device 130B (more specifically, by comparing the specific parameters to reference parameters stored by the charger 10B). Once the downward facing plug 110B is moved into alignment with the upward facing socket 120B based on the image or images captured by the downward facing camera 130B, the proximity sensor 140 may then be used to refine and stop the final spatial movement required to move the downward facing plug 110B into connection with the upward facing socket 120B.

Like with the embodiment of FIGS. 1 to 5B, the charger 10B of this alternative embodiment also comprises a controller or control system 500 (as shown in FIG. 11) in the form of an electronic control unit. This unit 500 is arranged to control the active components of the charger 10B, for example, the above mentioned actuators 230B, 330B, 340B of the movable plug assembly to control the movement in respect of the movable plug assembly. In particular, the controller 500 controls the actuator 230B of the laterally movable platform 200B to control the lateral movement of the laterally movable platform 200B in the x axis, and controls the actuators 330B and 340B of the vertically and longitudinally extendable arm 300B to control the both the Z axis vertical movement and the Y axis longitudinal movement of the vertically and longitudinally extendable arm 300B.

In this alternative embodiment, the controller 500 is also adapted to control the other active components of the charger 10B such as the image capturing device 130B and the proximity sensor 140B. In this alternative embodiment, the unit 500 also communicates with the electric vehicle wirelessly.

Referring now to diagram 7B, the vertically and longitudinally extendable arm 300B is attached at one end to the laterally movable platform 200B. As indicated above, the vertically and longitudinally extendable arm 300B operates in both the Y and the Z axes. Also, when the charger 10B is mounted to the ceiling, the vertically and longitudinally extendable arm 300B is attached to the laterally movable platform 200B at an upper end of the arm 300B.

The vertically and longitudinally extendable arm 300B comprises an upper arm 304B and a lower arm 307B. The lower arm 307B is smaller than the upper arm 304B, and can be nestled inside the larger arm 304B when the vertically extendable arm 300B is retracted or raised to the ceiling. The two arms 304B, 307B form two channels which together provide a continuous pathway through which one or more electrical cables 600B can pass (without overly bending each cable 600B).

The left end of the vertically and longitudinally extendable arm 300B is attached to the laterally movable platform 200B by a mount 301B that supports the upper arm 304B. As shown in FIG. 7B, the upper arm 304B is adapted to pivot about an axis 303B on a first position in respect of the mount 301B and the lower arm 307B is adapted to pivot about an axis 305B on a second position in respect of the upper arm 304B at the right end of the upper arm 304B.

The vertically and longitudinally extendable arm 300B comprises a plurality of links 306B, 308B, 310B. The upper arm 304B and the lower arm 307B, together with the pairs of linkages 306B, 308B and 310B are arranged in the form of a double parallelogram. By the use of such a double parallelogram mechanism, the self aligning head holder 309B of this embodiment of charger 10B always points vertically downwards as it is mechanically directed by the system of linkages, 306B, 308B, and 310B. Additionally, the plug 110B (which is attached to the aligning head holder 309B via the aligning head 400B) always faces downwards, unless when moved by other mechanisms (such as those for enabling passive alignment or movement of the downward facing plug 110B into the upward facing socket 120B, as described below).

The system of linkages 306B, 308B, 310B includes two pairs of links 308B, 310B within the lower arm 307. At the right end of the lower arm 307B is a pair of middle links 310B that is shorter than the pair of upper links 306B. There is also a pair of lower links 308B connected to the pair of middle links 310B. The pair of middle links 310 pivots on the same axis 305B as the lower arm 307B at their upper connection. The lower connecting point of the pair of middle links 310B connects to the pair of lower links 308B.

In addition to system of linkages 306B, 308B, 310B, the vertically and longitudinally extendable arm 300B also includes a self-aligning head holder 309B attached to the vertically and longitudinally extendable arm 300B at one end of the lower arm 307B. The pivot point 302B of the self-aligning head holder 309B is inside the outer shape of the lower arm 307B on a separate bracket. An enlarged sectional view of the end of the vertically and longitudinally extendable arm 300B in its retracted orientation is shown in section A of FIG. 7B. As illustrated in the section, by having a pivot point inside the outer shape of the lower arm 307B on a separate bracket, the lower arm 307B can retract into the upper arm 304B and electrical cable or cables 600B can pass through from the upper arm 304B via the lower arm 307B to the downward facing plug 110B within the self-aligning head holder 309B. In this alternative embodiment, the self-aligning head holder 309B extends above the arm 307B to provide a high cable support point 311B that allows a suitable distance for the cable 600B to be free to move or rotate as the cable 600B approaches the self-aligning head 400B.

In this alternative embodiment, the cable 600B is formed as a large flexible loop beyond the cable support point 311B that allows unrestricted movement of the self-aligning head holder 309B relative to the lower arm 307B.

In this alternative embodiment, the linkages 306B, 308B, 310B are shown to lie within the extendable arm assembly 300B. It is envisaged however that, in another embodiment, the linkages 306B, 308B, 310B may be fully or partly outside the extendable arm assembly 300B.

Also, in this alternative embodiment, the linkages 306B, 308B, 310B are shown as two parallel sets. It is envisaged however that, in other embodiments, there may be only one set of linkages, or there may be multiple sets of linkages.

The pair of lower links 308B connects to a pivot on the aligning head holder 309B, directing and locking the aligning head holder 309B to always remain vertical when the vertically and longitudinally extendable arm 300B extends or retracts.

As indicated above, the charger 10B includes a self-aligning head 400B connected to the vertically and longitudinally extendable arm 300B by way of the above mentioned self-aligning head holder 309B. The downward facing plug 110B is adapted to be fitted on to the self-aligning head 400B.

As will be described in further detail below in respect of FIGS. 8A and 8B, the self-aligning head 400B includes a number of mechanisms for enabling passive alignment or movement of the downward facing plug 110B when the downward facing plug 110B is connecting to or entering into the upward facing socket 120B, and a number of mechanisms for enabling the downward facing plug 110B to return to a default position when the downward facing plug 110B disengages with the upward facing socket 120B.

Figure 8A:
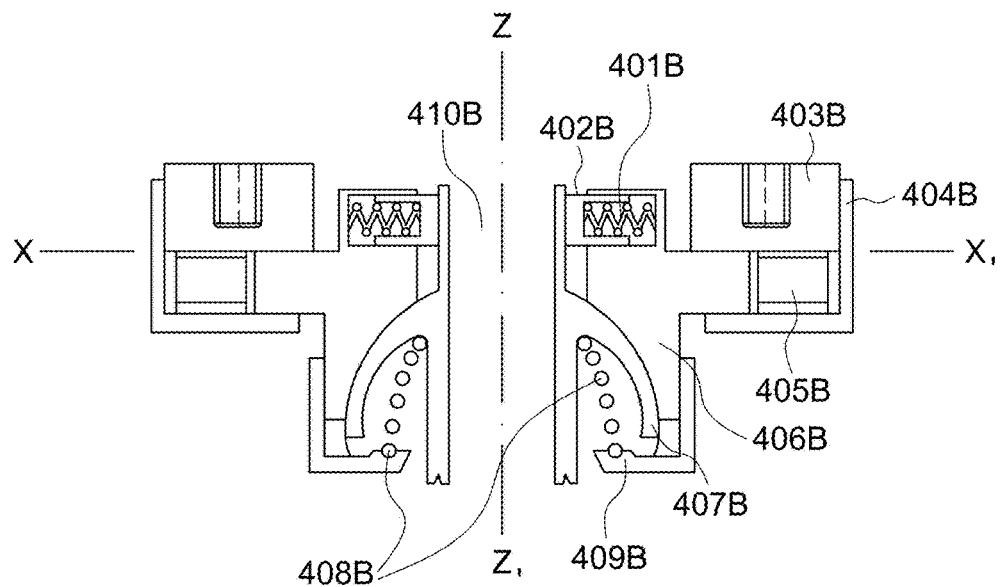
FIG. 8A is a sectional view of the self-aligning head of the charger of FIG. 6.

FIG. 8A is a sectional view of the self-aligning head 400B. As illustrated in the figure, the aligning head 400B features a low profile design, and comprises a mount 403B to which an upper cap 404B is attached. In between the mount 403B and the upper cap 404B is a movable alignment slide 406B. The outer diameter of the slide 406B is separated from the inner diameter of the upper cap 404B by a leaf ring spring 405B which allows the slide 406B to move in the X and Y planes when the downward facing plug 110B is engaging with the upward facing socket 120B and to return to a default centre position when the downward facing plug 110B is disengaged from the upward facing socket 120B. On the inner and outer diameters of the leaf ring spring 405B are a number of protruding keys adapted to engage with a number of slots in the slide 406B and the upper cap 404B to counteract any rotation of the slide 406B.

The self-aligning head also comprises a pivotable connecting head 407B that the downward facing plug 110B is fitted to. As illustrated in FIG. 8A, the connecting head 407B comprises a hollow centre 410B for allowing the one or more electrical cables 600B to pass through the self-aligning head 400B to the downward facing plug 110B (for example, to the image capturing device 130B, the proximity sensor 140B, and to the conductors 113B for charging the electric vehicle).

The connecting head 407B can pivot at an angle to the Z axis, by movement between the mating spherical surfaces of the connecting head 407B and the slide 406B. A tapered coil lift spring 408B provides part of the centring force for returning the connecting head 407B back to its default (for example, central position) and an upwards force for keeping the spherical surfaces of the connecting head 407B and the slide 406B in contact with each other. The tapered coil lift spring 408B is supported by a lower cap 409B. In this respect, it is envisaged that, in another embodiment, the lower cap 409 may also have a spherical mating surface that matches that of an extended spherical surface on the slide 406B providing a supporting pocket in which the connecting head 407B can pivot. A square cam profile is incorporated in the upper section of the connecting head 407B to control any rotation or pivot about the Z axis of the connecting head 407B. Applying forces to the cam faces are four anti-rotation followers 402B each comprising one or more springs 401B. These followers 402B rotate and or pivot the aligning head 400B back to a default position when the downward facing plug 110B is disengaged with the upward facing socket 120B.

In this alternative embodiment, the above mentioned spring forces that act on the connecting head 407B are set to allow any movements off the central or start position to occur in a particular order. For example, the spring force applied by the circular leaf spring 405B on the slide 406B and hence to the connecting head 407B is set to be lighter compared to the spring forces applied by the tapered spring 408B and the anti-rotation springs 401B, thereby allowing any translational or sideways movement of the connecting head 407B to occur first before any pivotal and rotational movements. Because the spring forces applied by the tapered spring 408B and the anti-rotation springs 401B are set to be heavier, there will be a delay for any pivotal or rotational movement until the downward facing plug 110B is partially entered or connected into the upward facing socket 110B. In this respect, it is envisaged that, in another embodiment, the spring forces and order of events may be different. For example, in another embodiment, the spring forces applied by the tapered spring 408B and the anti-rotation springs 401B may be set to be lighter that the spring force applied by the circular leaf spring 405B on the slide 406B.

Figure 8B:
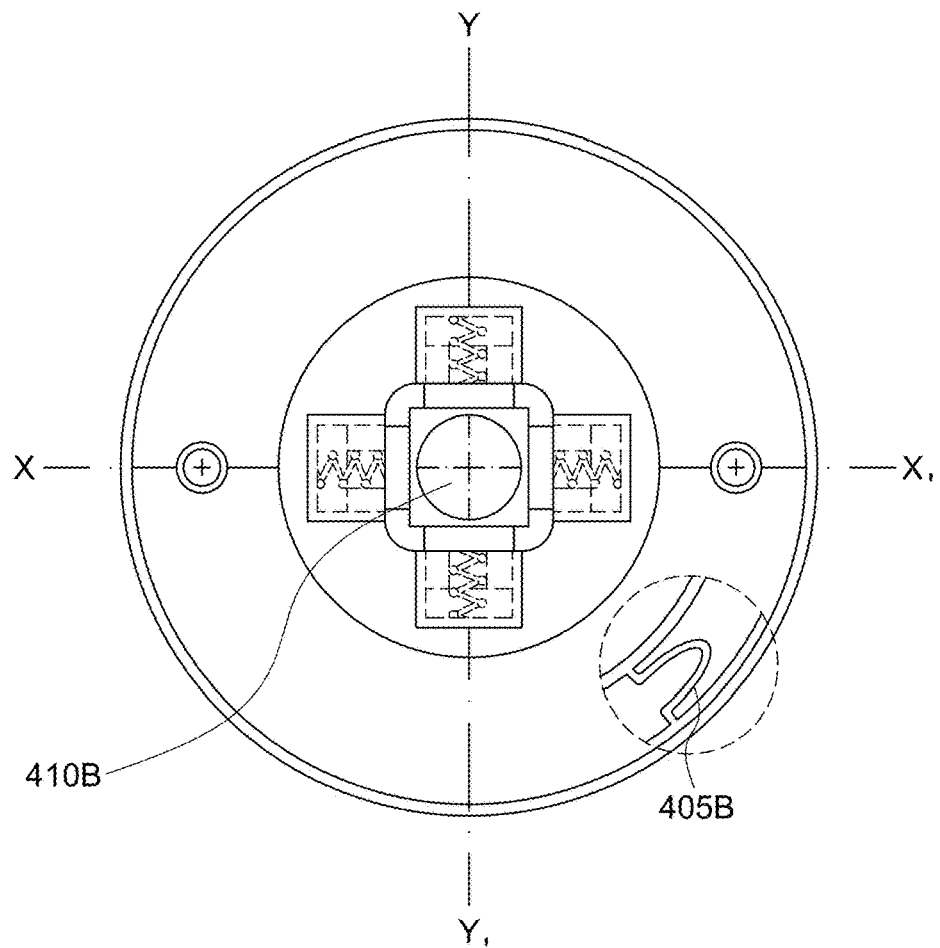
FIG. 8B is a top view of the self-aligning head of FIG. 8A.

FIG. 8B is a top view of the self-aligning head 400B showing the centre cable pathway 410B that allows room for movement of one or more electrical cable or cables 600B passing through the self-aligning head 400B to the downward facing plug 110B (that is, to the image capturing device 130B, the proximity sensor 140B, the conductors 113B for charging the electric vehicle etc.), and a more detailed X-ray view showing in greater detail the arrangement of the leaf ring spring 405B.

Figure 9A:
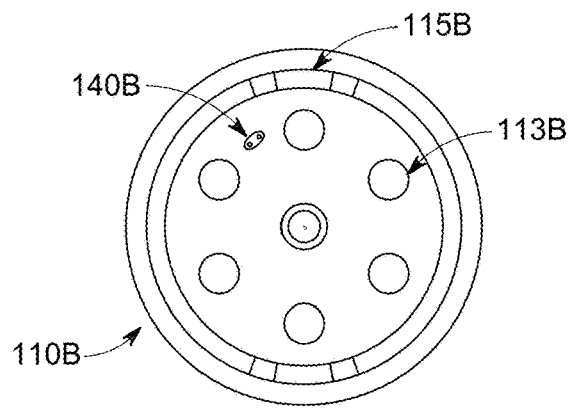
FIG. 9A is a bottom view of the downward facing plug of the self-charger of FIG. 6.
Figure 9B:
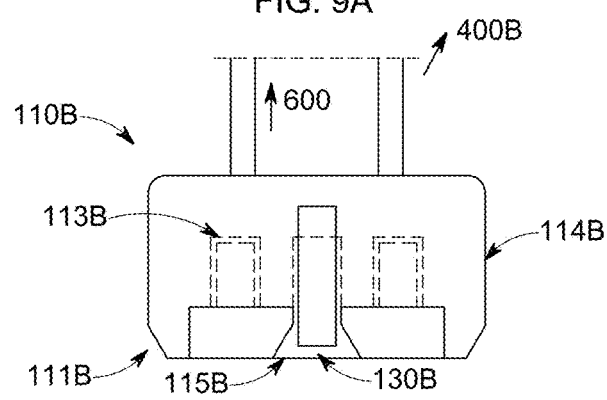
FIG. 9B is a sectional view of the downward facing plug of FIG. 9A.

FIG. 9A is a bottom view of the downward facing plug 110B and FIG. 9B is a sectional view of the downward facing plug 110B. As illustrated in these figures, the downward facing plug 110B includes a centrally located image capturing device 130B in the form of a camera and a single position sensor 140B in the form of a proximity sensor. In this alternative embodiment, both the downward facing camera 130B and the proximity sensor 140B are provided at one side of the downward facing plug 110B. Thus, both the downward facing camera 130B and the sensor 140B are disposed at an end of the vertically and longitudinally extendable arm 300B.

In this alternative embodiment, the downward facing camera 130B is disposed at the centre of the downward facing plug 110B and the sensor 140B is disposed at an off-centre location. It is envisaged however that either or both the downward facing camera 130B and sensor 140B may be positioned differently. It is envisaged that, in another embodiment, the downward facing camera 130B may be attached to a spring loaded slide that enables the downward facing camera 130B to retract deep inside the downward facing plug 110B as the downward facing plug 110B enters the upward facing socket 120B. The charger 10B in this other embodiment may be arranged such that the downward facing camera 130B is able to automatically return to a default or normal position once the downward facing plug 110B disengages or leaves the upward facing socket 120B to provide a wider field of view.

The downward facing plug 110B also comprises a number of conductors 113B arranged around the centrally located image capturing device 130B. In this alternative embodiment, there are six female conductors 113B in the downward facing plug 110B. However, it is envisaged that, in another embodiment of the charger 10B, there may be more or less than six conductors 113B in the downward facing plug 110B. As will be described in greater detail below in respect of the controller 500 illustrated in FIG. 11, these conductors 113B provide not only power from the charger 10B to the electric vehicle, but may also enable the charger 10B to communicate with (for example, to receive commands from or to send information to) the electric vehicle in this embodiment.

The downward facing plug 110B also comprises a lead in design 111B that allows for any slight lateral misalignment when the movable plug assembly moves the downward facing plug 110B into the upward facing socket 120B. In this alternative embodiment, the lead in design is at an approximately 30 degrees angle, and can correct misalignment of about 6 mm (that is, +/−6 mm). However, it is envisaged that, in another embodiment, the lead in angle may be different or that there may be no lead in at all.

The downward facing plug 110B also comprises a smooth outer cylindrical shape 114B that is matched with a small clearance to the smooth inner cylindrical shape 128B of the upward facing socket 120B. If there is present a slight vertical angular misalignment between the centreline axis of the downward facing plug 110B in relation to the centreline axis of the upward facing socket 120B, a self-aligning force is thus automatically generated between the cylindrical shapes. The force will act to move the downward facing plug 110B into vertical angular alignment relative to the upward facing socket 120B as the downward facing plug 110B moves down into the upward facing socket 120B.

The downward facing plug 110B also includes a number of alignment guide slots 115B to correct for any slight rotational misalignment when the movable plug assembly moves the downward facing plug 110B into the upward facing socket 120B. In this alternative embodiment, these guide slots 115B are in the form of two female alignment guide slots 115B with angled lead in entrance pathways that can correct for rotational misalignment of about 5 degrees. Like with the lead in design, it is envisaged that, in another embodiment, the number or form of the alignment guide slots 115B may be different or that there may be no alignment guide slots 115B at all.

Figure 10A:
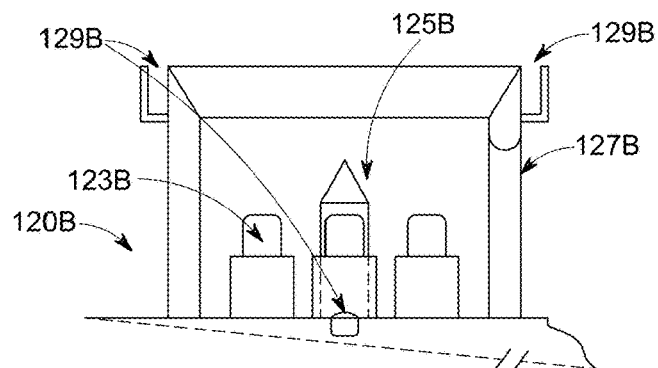
FIG. 10A is a sectional view of the upward facing socket on top of an electric vehicle.
Figure 10B:
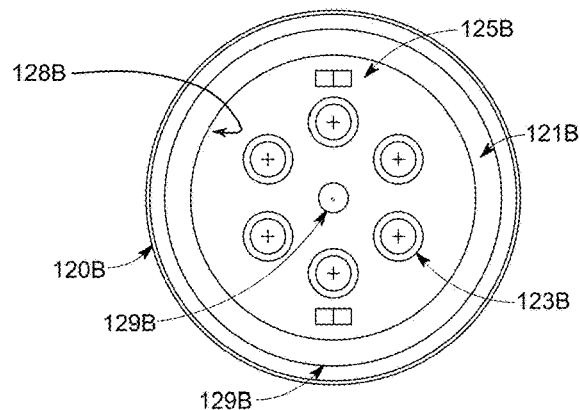
FIG. 10B is a bottom view of the upward facing socket on top of the electric vehicle of FIG. 10A.

FIG. 10A is a sectional view of the upward facing socket 120B and FIG. 10B is a bottom view of the upward facing socket 120B. The upward facing socket 120B includes a number of conductors 123B for receiving power or electrical power from the downward facing plug 110B. In this alternative embodiment, these conductors 123B are in the form of six male conductors that correspond to the six female conductors 113B of the downward facing plug 110B. The conductors 123B of the upward facing socket 120B are raised up off the base of the upward facing socket 120B to allow for drainage and debris to fall through. Also, the upward facing socket 120B comprises two male rotational alignment guides 125B for aligning the downward facing plug 110B to the upward facing socket 120B before the conductors 113B, 123B of the downward facing plug 110B and the upward facing socket 120 make contact.

It is envisaged that, in another embodiment, the conductors 113B of the downward facing plug 110B may at times receive power from the conductors 123B of the upward facing socket 120B. In such an embodiment, the batteries of the electric vehicle would return stored electrical power back to the supply source of the charger 10B. Such return of stored electrical power may be based on protocols previously set in the controller 500. This would allow use of the capacity of the vehicle's battery to form part of the energy storage system of the charger (for example, in the form of an external battery stored in the garage for storing the electric vehicle).

In this alternative embodiment, the upward facing socket 120B is provided at an off-centre location on the roof of the electric vehicle near the rear pillar (that is, at the pillar nearest the back end of the electric vehicle) of the roof on top of the electric vehicle. Like with the embodiment of FIGS. 1 to 5, this is advantageous in that roof racks can be used even when the charger 10B is charging the electric vehicle. It is envisaged that the upward facing socket 120B may alternatively not be positioned at an off-centre location on the roof of the electric vehicle near the rear pillar in an alternative embodiment. For example, in another alternative embodiment, the upward facing socket 120B may be positioned near a front pillar rather than the rear pillar of the roof of the electric vehicle.

Images in respect of the upward facing socket 120B are captured by the downward facing camera 130B to enable the controller 500 to control the movement in respect of the movable plug assembly. The upward facing socket 120B includes a number of indicator or indicators 129B for enabling the controller 500 to identify the upward facing socket 120B. Firstly, there is a LED light ring 129B disposed around a circumference of the upward facing socket 120B for illuminating the upward facing socket 120B. This light ring 129B points up and enables the controller 500 to identify the upward facing socket 120B when the downward facing camera 130B is relatively far away from the upward facing socket 120B. Also, by using some form of visual indicator (such as the LED light ring 129B, the downward facing camera 130B can accurately capture an image of the upward facing socket 120B even when there is little or no light (such as in a dark car garage). Secondly, there is a single LED positioned at the centre of the socket for enabling the controller 500 to identify the upward facing socket 120B when the downward facing camera 130B is closer to the socket. It is envisaged that the upward facing socket 120B may include alternative or additional indicators. For example, in another alternative embodiment, there may be only a single LED indicator disposed at a centre position of one side of the upward facing socket 120B.

While not shown in FIGS. 10A and 10B, the upward facing socket 120B is also fitted with a flush mounted cover flap driven by an actuator to open the cover flap when the upward facing socket 120B is in use (in particular, when the charger 10 is charging the electric vehicle) and to close the cover flap when the upward facing socket 120B is not in use. Thus, when the cover flap is closed, the upward facing socket 120B is moulded and sealed. In this alternative embodiment, the upward facing socket 120B also has a drain assembly 127B formed from openings around the perimeter of the socket to allow water to escape or drain to a nearby window, down to the wheel arch etc.

Finally, like with the downward facing plug 110B, the upward facing socket 120B also comprises a lead in design 121B corresponding to that of the downward facing plug 110B. This lead in design allows for any slight lateral misalignment when the movable plug assembly moves the downward facing plug 110B into the upward facing socket 120B. In this alternative embodiment, the lead in design of the socket-like with the downward facing plug 110B—is at an approximately 30 degrees angle. However, it is envisaged that, in another embodiment, the lead in angle may be different or that there may be no lead in at all In this alternative embodiment, the physical characteristics of the design of the downward facing plug 110B and the upward facing socket 120B as well as the aligning head 400B allow small amounts of automatic movement (that is, self-alignment) of the downward facing plug 110B with respect to the upward facing socket 120B as the vertically and laterally extendable arm 300B moves the downward facing plug 110B into engagement with the upward facing socket 120B. In the event of a small misalignment as the downward facing plug 110B enters the upward facing socket 120B, self-aligning forces are created firstly by the lead-in features, secondly by the diametric fits of the plug into the socket and lastly by the rotational aligning guides and slots. These self-aligning features are staged to occur based on the engagement heights or distances as the plug enters the socket. As described above, the self-aligning head 400B to which the downward facing plug 110B is attached allows the necessary degrees of lateral, pivotal or rotational movement to allow the downward facing plug 110B to fully engage and connect to the upward facing socket 120B. In the event of no misalignment as the downward facing plug 110B engages with the upward facing socket 120B, the features built into this design will remain inactive.

In this alternative embodiment, the self-aligning features correspond to physical variations in the manner in which the vehicle is stopped in the charging (or parking) position or in the way the charger 10B engages with the vehicle.

The lateral aligning feature allows for the vertical axis of the plug assembly 110 to be a small amount out of lateral alignment with the upward facing socket 120. This could be due to a slight variation in position of the socket as viewed by the charger 10

The pivoting aligning feature allows for the vehicle to be slightly off level if for example there is an off centre load inside the vehicle or trunk or both.

The rotational alignment feature allows for the vehicle to be parked at a slight angle left or right from the centreline in the parking or charging position.

In this alternative embodiment, the self-aligning features are built into the plug and socket assemblies. It is envisaged however that, in another embodiment, the identical self-aligning features may be built into housings that surround standard plug and socket assemblies. Additionally, in another embodiment, the functions of the set of springs 401B which control both the pivotal and rotational alignments in the self aligning head 400B would be separated so that the pivotal and rotational aligning features would have their own independent springs whilst still retaining the same lateral, rotational and pivotal self aligning features as described above.

Person skilled in the art will appreciate that the upward facing socket 120B may include other components. For example, it is envisaged that the electric vehicle may not have just one upward facing socket 120B. Thus, in an alternative embodiment, the electric vehicle may have an additional side entry socket for connection with other types of electric vehicle chargers.

As indicated above, the charger 10A of FIGS. 1 to 5B and the charger 10B of FIGS. 6 to 10B each includes a controller 500. In either embodiment, the controller 500 is connected to the active components of the charger 10A, 10B such as the image capturing device 130A, 130B and components (for example, the laterally movable platform 200A, 200B) of the movable plug assembly.

In either embodiment, the controller 500 is an electronic control unit comprising a processor that implements a number of software modules based on program code and data stored in a memory 590. Persons skilled in the art will appreciate that the modules need not be implemented using a processor and/or be based on program code and data stored in a memory, and that one or more of the modules could be implemented in some other way, for example by a dedicated circuit.

FIG. 11 is a functional block diagram of the modules implemented by the controller 500. As illustrated in the figure, the modules implemented by the controller 500 include a platform controller 520, an arm controller 530, a plug controller 512, a camera controller 513, a sensor controller 514 and a spatial movement determiner 580.

The camera controller 513 is configured to control the downward facing camera 130A, 130B to capture at least one image in respect of the upward facing socket 120A, 120B. Images captured by the downward facing camera 130A, 130B are processed by the spatial movement determiner 580 using object recognition technology to recognize or identify the upward facing socket 120A, 120B. For example, once the charger 10A, 10B is activated, the camera controller 513 may control the downward facing camera 130A, 130B to capture the at least one image in respect of the upward facing socket 120A, 120B, by controlling the downward facing camera 130A, 130B to repeatedly capture one or more images until the spatial movement determiner 580 recognizes the upward facing socket 120A, 120B from at least one of the one or more images captured by the downward facing camera 130A, 130B. In either embodiment, the spatial movement determiner 580 may recognize the upward facing socket 120A, 120B by recognizing at least one of a number of indicators 129A, 129B including a LED light ring and an LED at the centre of the upward facing socket 120A, 120B.

In either embodiment, object recognition technology is used by the controller 500 in order to recognize or identify the upward facing socket 120A, 120B from the images in respect of the upward facing socket 120A, 120B captured by the image capturing device 130A, 130B. However, it is envisaged that, in an alternative embodiment, rather than the controller 500, the image capturing device 130A, 130B may incorporate such object recognition technology.

In addition to recognizing the upward facing socket 120A, 120B, the spatial movement determiner 580 is also configured to determine the required spatial movement of the components of the movable plug assembly to move the downward facing plug 110A, 110B into alignment with the upward facing socket 120A, 120B. In either embodiment, the spatial movement determiner 580 determines the required spatial movement after identifying or recognizing the upward facing socket 120A, 120B from the images captured by the downward facing camera 130A, 130B. In either embodiment, the spatial movement determiner 580 determines the required spatial movement from at least one image in respect of the upward facing socket 120A, 120B captured by the downward facing camera 130A, 130B based on one or more characteristics (such as the size, orientation and/or location) of the at least one indicator 129A, 129B in the at least one image.

The platform controller 520 and the arm controller 530 are configured to control respectively the movement of the laterally movable platform 200A, 200B and the vertically or vertically and longitudinally extendable arm 300A, 300B based on the required spatial movement determined by the spatial movement determiner 580. In either embodiment, the controller 500 may be configured such as the platform controller 520 controls the movement of the laterally movable platform 200A, 200B before the arm controller 530 controls the movement of the vertically or vertically and longitudinally extendable arm 300A, 300B. However, it is envisaged that this need not be the case. For example, in an alternative embodiment, the arm controller 530 may control the movement of the vertically or vertically and longitudinally extendable arm 300A, 300B before the platform controller 520 controls the movement of the laterally movable platform 200A, 200B. In yet another embodiment, the laterally movable platform 200A, 200B and the vertically or vertically and longitudinally extendable arm 300A, 300B may be controlled to move simultaneously.

It is envisaged that the movement of the laterally movable platform 200A, 200B and/or the vertically or vertically and longitudinally extendable arm 300A, 300B may be performed while required spatial movements are determined by the spatial movement determiner 580 and images are captured by the downward facing camera 130A, 130B. Thus, the camera controller 513 repeatedly controls the downward facing camera 130A, 130B to capture the at least one image, the spatial movement determiner 580 continuously determines any required spatial movement, and the platform controller 520 and/or the arm controller 530 continuously control the movement of the laterally movable platform 200A, 200B and/or the vertically or vertically and longitudinally extendable arm 300A, 300B, until the downward facing plug 110A, 110B is aligned and connected with the upward facing socket 120A, 120B.

It will be appreciated that the conductors 113A, 130B of the downward facing plug 110A, 110B may not connect or be in a position to connect with the conductors 123A, 123B of the upward facing socket 120A, 120B after the downward facing plug 110A, 110B has been moved into alignment with the upward facing socket 120A, 120B. That is, it is envisaged that further movement in respect of the movable plug assembly may be required after the downward facing plug 110A, 110B has been moved into alignment with the upward facing socket 120A, 120B by the movable plug assembly based on the image or images captured by the downward facing camera 130A, 130B. As indicated above, the spatial movement determiner 580 may also determine that no further spatial movement of one or more components of the movable plug assembly may be required.

When the downward facing plug 110A, 110B approaches the upward facing socket 120A, 120B, it is envisaged that the controller 500 will slow down and refine such movements as the downward facing plug 110A, 110B approaches. As the downward facing plug 110A, 110B engages with the upward facing socket 120A, 120B, the proximity sensor 140A, 140B senses whether the downward facing plug 110A, 110B is a predetermined proximity of (or predetermined distance away from) the upward facing socket 120A, 120B. The controller 500 controls the movable plug assembly to stop the downward motion when the downward facing plug 110A, 110B is a predetermined distance or depth from the upward facing socket 120A, 120B. In this respect, it is envisaged that, in an embodiment, one or more of the passive mechanisms of the downward facing plug 110A, 110B and the upward facing socket 120A, 120B (such as the spring loaded section just above the downward facing plug 110A, 110B) may be configured to maintain a slight pressure to maintain the connection between the downward facing plug 110A, 110B and the upward facing socket 120A, 120B when the downward facing plug 110A, 110B is in connection with the upward facing socket It is envisaged that alternative embodiments of the charger 10A, 10B may be configured to enable a movement or movements of the upward facing socket 120A, 120B that are in addition and/or alternative to those described above. For example, in another embodiment of the charger 10A, 10B, an additional motorised downwards movement is incorporated. This comes into effect with a different operating sequence whereby the downward facing plug 110A, 110B moves downwards and stops immediately above and in alignment with the upward facing socket 120A, 120B. In this embodiment, the aligning head 400A 400B, together with the downward facing plug 110A, 110B then drive vertically downwards so that the downward facing plug 110A, 110B moves into connection with the upward facing socket 120A, 120B. At the time this occurs, the aligning head 400A, 400B features operate normally and the vertically extendable arm 300A, 300B remains stopped.

As indicated above, further movement in respect of the movable plug assembly may be required even after the movable plug assembly moves the downward facing plug 110A, 110B into alignment with the upward facing socket 120A, 120B based on the image or images captured by the downward facing camera 130A, 130B. To determine whether or not such further movement is required, the spatial movement determiner 580 relies on the sensor controller 514 which is configured to control the proximity sensor 140A, 140B (as described above) to sense whether or not the downward facing plug 110A, 110B is within a predetermined proximity of (or predetermined distance from) the upward facing socket 120A, 120B.

For example, after the downward facing plug 110A, 110B is moved into alignment with the upward facing socket 120A, 120B by the movable plug assembly 110A, 110B (that is, by either or both the laterally movable platform 200A, 200B and the vertically or vertically and longitudinally extendable arm 300A, 300B), the spatial movement determiner 580 determines any further required spatial movement of the components of the movable plug assembly to move the downward facing plug 110A, 110B into connection with the upward facing socket 120A, 120B based on whether or not the downward facing plug 110A, 110B is within the predetermined proximity of the upward facing socket 120A, 110B as sensed by the proximity sensor 140A, 140B.

Thus, when in use, the spatial movement determiner 580 determines that further movement is required and the controller 500 (that is, either one or both of the platform controller 520 and the arm controller 530) controls the movable plug assembly (that is, the laterally movable platform 200A, 200B and/or the vertically or vertically and longitudinally extendable arm 300A, 300B) to move, until the proximity sensor 140A, 140B senses that the downward facing plug 110A, 110B is within the predetermined proximity of the upward facing socket 120A, 120B. Once the proximity sensor 140A, 140B senses that the downward facing plug 110A, 110B is within the predetermined proximity of the upward facing socket 120A, 120B, the spatial movement determiner 580 determines that no further movement is required and the controller 500 controls the movable plug assembly to stop moving. In this respect, it is envisaged that the controller 500 may alternatively or additionally stop the movement in respect of the movable plug assembly (that is, stop movement of either one or both of the laterally movable platform 200A, 200B and the vertically or vertically and longitudinally extendable arm 300A, 300B) in other circumstances, for example, when the controller 500 determines that the movable plug assembly can no longer move in a direction determined by the spatial movement determiner 580. Also, as indicated above, it will be appreciated that the passive alignment mechanisms provided by the aligning head 400A, 400B, the downward facing plug 110A, 110B and the upward facing socket 120A, 120B may align the downward facing plug 110A, 110B such that the conductors 113 of the downward facing plug 110A, 110B contact with the conductors 123A, 123B of the upward facing socket 120A, 120B while the movable plug assembly actively moves the movable plug assembly.

The plug controller 512 is adapted to control the conductors 113A, 113B of the downward facing plug 110A, 110B to output electrical power. In use, the plug controller 512 controls the conductors 113A, 113B of the downward facing plug 110A, 110B to output electrical charge or power to the conductors 123A, 123B of the upward facing socket 120A, 120B to charge the electric vehicle when the conductors 113A, 113B of the downward facing plug 110A, 110B are in contact with the conductors 123A, 123B of the upward facing socket 120A, 120B.

In addition to the above mentioned components, either charger 10A, 10B may also include other components for providing additional functionality.

For example, either charger 10A, 10B may include an ultrasonic sensor fitted to the bottom of the main casing of the charger 10A, 10B. The ultrasonic sensor may be adapted to sense the arrival of the electric vehicle when the electric vehicle enters the garage. A Bluetooth device may be included with the ultrasonic sensor to enable a driver of a Bluetooth enabled electric vehicle to control whether or not either charger 10A, 10B is to be enabled when the ultrasonic sensor senses the arrival of the electric vehicle.

Also, either charger 10A, 10B may also include four small LEDs provided on the corners of the bottom of the main casing of the charger 10A, 10B. When the ultrasonic sensor senses the arrival of the electric vehicle, these LEDs may light up to illuminate the roof area of the electric vehicle. This is advantageous in that images in respect of the upward facing socket 120A, 120B can be captured with sufficient clarity (for example, with sufficient resolution) by the image capturing device 130A, 130B even when there is insufficient light (for example, when the electric vehicle enters the garage at night).

Either charger 10A, 10B may also include mechanisms adapted to perform system checks before automatically moving the movable plug assembly to connect the downward facing plug 110A, 110B to the upward facing socket 120A, 120B. These mechanisms may be also arranged to, once the downward facing plug 110A, 110B has entered the upward facing socket 120A, 120B, carry out physical connection checks. Thus, in such an embodiment, charging of the electric vehicle may be initiated by activating a main charger contactor of the charger 10A, 10B when the physical connection checks are completed.

In such an embodiment, a safety contactor may be provided on the electric vehicle. This safety contactor may be enabled to link the conductors 123A, 123B of the upward facing socket 120A, 120B to the rest of the vehicle's charging system. Thus, the socket conductors 123A, 123B on the electric vehicle can be kept safe when the downward facing plug 110A, 110B is disconnected from the upward facing socket 120A, 120B.

As indicated above, the charger 10A, 10B of either embodiment is mounted to the ceiling of an electric vehicle garage. It is envisaged that the bottom most point of either charger 10A, 10B, when mounted to the ceiling of the garage and retracted, will typically be slightly higher than the opening or door of the garage. For example, the bottom most point of either charger 10A, 10B, when mounted to the ceiling of the garage and retracted, may be 2.15 meters from the ground for a typical garage door opening (which is typically 2.1 meters (or 7 feet) tall).

As indicated above, either charger 10A, 10B, when retracted, is in a compact form that has an external size of no more than 630 mm×630 mm×260 mm. This ensures that either charger 10A, 10B does not interfere with the electric vehicle stored in the garage when the charger 10A, 10B is retracted. However, it is envisaged that, depending on the embodiment, the charger 10A, 10B may be smaller or larger.

It is envisaged that the charger 10A, 10B, when in use, will move within the following ranges: X: 580 mm; Y: 550 mm; Z: 750 mm. However, it will be appreciated that an alternative embodiment of either charger 10A, 10B may move outside these ranges if required, for example, where a larger target area is needed.

Finally, it is envisaged that either charger 10A, 10B will have a minimum design life of 100,000 cycles. However, it will be appreciated that another embodiment of either charger 10A, 10B may have more or less minimum design life.

It will be understood to persons skilled in the art that many modifications may be made to the above embodiment or embodiments, in particular, features of various embodiments and examples may be combined to form further embodiments.

For example, it is envisaged that additional communication devices may be included in either charger 10A, 10B. For example, either charger 10A, 10B may include a communication that sends a SMS or text message when the electric vehicle is not parked in a position that allows the charger 10A, 10B to connect the downward facing plug 110A, 110B to the upward facing socket 120A, 120B. Also, in an embodiment where the electric vehicle is adapted to monitor the state of charge, either charger 10A, 10B may be controlled by the electric vehicle (for example, by a driver making a setting on a control panel of the vehicle) to stop charging once a preset charge state (which could be fully charged) is achieved.

Either charger 10A, 10B may also include additional safety features. For example, the controller 500 of either charger 10A, 10B may be programmed to automatically disconnect and retract the downward facing plug 110A, 110B from the upward facing socket 120A, 120B at certain situations, for example, when the electric vehicle is charged, when a car door is opened, when the car engine is initiated etc.

Also, either charger 10A, 10B may include a backup battery that allows the charger 10A, 10B to automatically disconnect and retract from the electric vehicle during power failure. In such an embodiment, the charger 10A, 10B may also include a communication that sends a SMS or text message during power failure.

In either embodiment, the electric vehicle is an electric car. However, it is envisaged that the electric vehicle may not be a car or be powered only by electricity. For example, the electric vehicle may be a hybrid motorboat that can be powered by either electricity or diesel.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It is to be understood that any reference to prior art made herein does not constitute an admission that the prior art forms or formed a part of the common general knowledge in the art, in Australia or any other country.

The invention claimed is:

1. A charger for charging an electric vehicle, comprising:
    a movable plug assembly comprising a downward facing image capturing device and a downward facing plug that is connectable to an upward facing socket on top of the electric vehicle, the movable plug assembly being mounted above the electric vehicle such that both the downward facing image capturing device and the downward facing plug of the movable plug assembly can be moved to be above the electric vehicle when the downward facing plug is not connected to the upward facing socket;
    and
    a controller connected to the movable plug assembly and the downward facing image capturing device, and arranged to:
        control the downward facing image capturing device to capture at least one image in respect of the upward facing socket; and
        when the downward facing plug is not in alignment or connection with the upward facing socket, control a movement in respect of the movable plug assembly based on the at least one image, in order to enable the downward facing plug to move from above the electric vehicle downwards into alignment or connection with the upward facing socket.

2. A charger as claimed in claim 1, wherein the controller controls the downward facing image capturing device to capture the at least one image in respect of the upward facing socket, by:
    controlling the downward facing image capturing device to repeatedly capture one or more images until the controller recognizes the upward facing socket from the one or more images.

3. A charger as claimed in claim 2, wherein the controller recognizes the upward facing socket from the one or more images, by recognizing at least one visual indicator on the electric vehicle from the one or more images.

4. A charger for charging an electric vehicle, comprising:
    a movable plug assembly comprising a proximity sensor and a downward facing plug that is connectable to an upward facing socket on top of the electric vehicle, the movable plug assembly being mounted above the electric vehicle such that both the proximity sensor and the downward facing plug of the movable plug assembly can be moved to be above the electric vehicle when the downward facing plug is not connected to the upward facing socket;
    and
    a controller connected to the movable plug assembly and the proximity sensor, and arranged to:
        control the proximity sensor to sense whether or not the downward facing plug is within a predetermined proximity of the upward facing socket; and
        upon the proximity sensor sensing that the downward facing plug is not within the predetermined proximity of the upward facing socket, control a movement in respect of the movable plug assembly in order to enable the downward facing plug to move from above the electric vehicle downwards into alignment or connection with the upward facing socket.

5. A charger as claimed in claim 4, wherein the controller is arranged to control the downward facing plug to output electric charge to charge the electric vehicle upon the proximity sensor sensing that the downward facing plug is within the predetermined proximity of the upward facing socket.

6. A charger as claimed in claim 1, wherein the movable plug assembly comprises:
    a mount for enabling the movable plug assembly to be mounted above the electric vehicle; and
    an extendable arm comprising:
        a first end connected to the mount; and
        an opposite second end at which the downward facing plug is provided such that the downward facing plug is above the electric vehicle when the extendable arm is not extended.

7. A charger as claimed in claim 6, wherein the movable plug assembly is mounted to a ceiling of a garage for storing the electric vehicle.

8. A charger as claimed in claim 6, wherein the extendable arm comprises a first section connected to the mount by a first pivot.

9. A charger as claimed in claim 8, further comprising a first actuator connected to the mount and the first section, and arranged to extend the first section away from the mount on the first pivot or contract the first section towards the mount on the first pivot.

10. A charger as claimed in claim 9, wherein the controller is arranged to control the first actuator to move the downward facing plug vertically and/or longitudinally towards the upward facing socket.

11. A charger as claimed in claim 8, wherein the extendable arm comprises a second section connected to the first section by a second pivot.

12. A charger as claimed in claim 11, further comprising a second actuator connected to the first section and the second section, and arranged to extend the downward facing plug away from the first section on the second pivot or contract the downward facing plug towards the first section on the second pivot.

13. A charger as claimed in claim 12, wherein the controller is arranged to control the second actuator to move the downward facing plug vertically and/or longitudinally towards the upward facing socket.

14. A charger as claimed in claim 6, wherein the mount is part of a laterally movable platform, and the controller is arranged to control the laterally movable platform to move the downward facing plug laterally towards the upward facing socket.

15. A charger as claimed in claim 1, wherein the downward facing plug is provided in a self-aligning head that pivots, translates and/or rotates the downward facing plug when the downward facing plug is moving downwards into alignment or connection with the upward facing socket.

16. A charger as claimed in claim 15, wherein the self-aligning head is arranged to spring back to a downward facing position when the downward facing plug is moved upwards out of alignment or connection with the upward facing socket.

17. A charger as claimed in claim 15, wherein the self-aligning head comprises at least one tapered guide corresponding to at least one chamfered guide slot of the upward facing socket,
wherein the at least one tapered guide rotates the downward facing plug into alignment or connection with the upward facing socket when the at least one tapered guide is moving downwards into alignment or connection with the at least one chamfered guide slot.

18. A charger as claimed in claim 15, wherein the self-aligning head comprises a chamfered cylindrical surface having a smaller diameter than a corresponding cylindrical surface of the upward facing socket,
wherein the at least one chamfered cylindrical surface translates the downward facing plug into alignment or connection with the upward facing socket when the at least one chamfered cylindrical surface is moving downwards into alignment or connection with the corresponding cylindrical surface of the upward facing socket.

19. A charger as claimed in claim 15, wherein the self-aligning head is connected to an end of the movable plug assembly by a pivot, and is arranged to pivot the downward facing plug into alignment or connection with the upward facing socket when the downward facing plug is moving downwards into alignment or connection with the upward facing socket.

20. A charger for charging an electric vehicle, comprising:
a movable plug assembly comprising:
an image capturing device;
a proximity sensor; and
a downward facing plug that is connectable to an upward facing socket on top of the electric vehicle, the movable plug assembly being mounted above the electric vehicle such that the image capturing device, the proximity sensor and the downward facing plug of the movable plug assembly can be moved to be above the electric vehicle when the downward facing plug is not connected to the upward facing socket;
and
a controller connected to the movable plug assembly, the image capturing device and the proximity sensor, and arranged to:
control the image capturing device to capture at least one image in respect of the upward facing socket; and
when the downward facing plug is not in alignment or connection with the upward facing socket, control a first movement in respect of the movable plug assembly based on the at least one image, in order to enable the downward facing plug to move from above the electric vehicle downwards into alignment with the upward facing socket;
control the proximity sensor to sense whether or not the downward facing plug is within a predetermined proximity of the upward facing socket; and
upon the proximity sensor sensing that the downward facing plug is not within the predetermined proximity of the upward facing socket, control a second movement in respect of the movable plug assembly in order to enable the downward facing plug to move from above the electric vehicle downwards into alignment or connection with the upward facing socket.

* * * * *